United States Patent
van de Nieuwegiessen et al.

(10) Patent No.: US 12,197,875 B2
(45) Date of Patent: Jan. 14, 2025

(54) AUTOMATED PREDICTIVE RESPONSE COMPUTING PLATFORM IMPLEMENTING ADAPTIVE DATA FLOW SETS TO EXCHANGE DATA VIA AN OMNICHANNEL ELECTRONIC COMMUNICATION CHANNEL INDEPENDENT OF DATA SOURCE

(71) Applicant: Khoros, LLC, Austin, TX (US)

(72) Inventors: Gijs van de Nieuwegiessen, Berkel Enschot (NL); Maksym Domariev, Brooklyn, NY (US); Murat Ozmerd, Schalkhaar (NL); Stefan Samba, Amsterdam (NL); Sander Wubben, Dorst (NL)

(73) Assignee: Khoros, LLC, Austin, TX (US)

( * ) Notice: Subject to any disclaimer, the term of this patent is extended or adjusted under 35 U.S.C. 154(b) by 241 days.

(21) Appl. No.: 17/390,967

(22) Filed: Jul. 31, 2021

(65) Prior Publication Data
US 2023/0030822 A1   Feb. 2, 2023

(51) Int. Cl.
*G06F 40/35* (2020.01)
*G06F 40/295* (2020.01)
(Continued)

(52) U.S. Cl.
CPC ............ *G06F 40/35* (2020.01); *G06F 40/295* (2020.01); *G06F 40/58* (2020.01); *G10L 15/26* (2013.01); *H04L 51/56* (2022.05)

(58) Field of Classification Search
CPC ........ G06F 40/35; G06F 40/295; G06F 40/58; G10L 15/26; H04L 51/56
See application file for complete search history.

(56) References Cited

U.S. PATENT DOCUMENTS

| 6,041,311 A | 3/2000 | Chislenko et al. |
| 6,146,026 A | 11/2000 | Ushiku |

(Continued)

FOREIGN PATENT DOCUMENTS

| CN | 102054033 A | 5/2011 |
| CN | 103177095 B | 12/2015 |

(Continued)

OTHER PUBLICATIONS

"Craigslist Online Community." Craigslist.org. Jul. 6, 2010.
(Continued)

*Primary Examiner* — Anne L Thomas-Homescu
(74) *Attorney, Agent, or Firm* — KOKKA & BACKUS, PC

(57) ABSTRACT

Various embodiments relate generally to data science and data analysis, computer software and systems, and control systems to provide a platform to implement automated responses to data representing electronic messages, among other things, and, more specifically, to a computing and data platform that implements logic to facilitate implementation of an automated predictive response computing system independent of electronic communication channel or linguistic language of an electronic message payload, the automated predictive response computing system being configured to implement, for example, adaptive data flow sets to automatically adapt a flow of responses responsive to, for example, classification of an electronic message. In some examples, a method may include detecting data representing one or more electronic messages, extracting features, identifying data representing intent-related data and data representing one or more entity attributes, and generating data as a reply as a function of intent-related data and one or more entity attributes.

20 Claims, 14 Drawing Sheets

(51) Int. Cl.
*G06F 40/58* (2020.01)
*G10L 15/26* (2006.01)
*H04L 51/56* (2022.01)

(56) References Cited

U.S. PATENT DOCUMENTS

| | | |
|---|---|---|
| 6,385,611 B1 | 5/2002 | Cardona |
| 6,684,239 B1 | 1/2004 | Flepp et al. |
| 6,742,032 B1 | 5/2004 | Castellani et al. |
| 6,871,232 B2 | 3/2005 | Curie et al. |
| 7,031,952 B1 | 4/2006 | Heumann et al. |
| 7,032,030 B1 | 4/2006 | Codignotto |
| 7,222,156 B2 | 5/2007 | Gupta et al. |
| 7,409,710 B1 | 8/2008 | Uchil et al. |
| 7,590,636 B1 | 9/2009 | Heumann et al. |
| 7,606,865 B2 | 10/2009 | Kumar et al. |
| 7,644,057 B2 | 1/2010 | Nelken et al. |
| 7,702,541 B2 | 4/2010 | Black et al. |
| 7,725,492 B2 | 5/2010 | Sittig et al. |
| 7,751,620 B1 | 7/2010 | Cosoi |
| 7,756,926 B2 | 7/2010 | Tseng et al. |
| 7,792,948 B2 | 9/2010 | Zhao et al. |
| 7,818,758 B2 | 10/2010 | Bonet et al. |
| 7,831,912 B2 | 11/2010 | King et al. |
| 7,853,565 B1 | 12/2010 | Liskov |
| 7,979,369 B2 | 7/2011 | Grenier et al. |
| 8,006,187 B1 | 8/2011 | Bailey et al. |
| 8,027,931 B2 | 9/2011 | Kalaboukis |
| 8,082,308 B1 | 12/2011 | Filev |
| 8,131,745 B1 | 3/2012 | Hoffman et al. |
| 8,171,128 B2 | 5/2012 | Zuckerberg et al. |
| 8,200,527 B1 | 6/2012 | Thompson et al. |
| 8,225,376 B2 | 7/2012 | Zuckerberg et al. |
| 8,286,154 B2 | 10/2012 | Kaakani et al. |
| 8,321,300 B1 | 11/2012 | Bockius et al. |
| 8,412,657 B2 | 4/2013 | Grenier et al. |
| 8,437,369 B2 | 5/2013 | Shaikli |
| 8,505,069 B1 | 8/2013 | Solodovnikov et al. |
| 8,606,792 B1 | 12/2013 | Jackson et al. |
| 8,615,442 B1 | 12/2013 | Kapur et al. |
| 8,744,937 B2 | 6/2014 | Seubert et al. |
| 8,752,041 B2 | 6/2014 | Akiyoshi et al. |
| 8,769,417 B1 | 7/2014 | Robinson et al. |
| 8,813,125 B2 | 8/2014 | Reisman |
| 8,825,515 B1 | 9/2014 | Hanson |
| 8,886,580 B2 | 11/2014 | Grenier et al. |
| 8,892,524 B1 | 11/2014 | Lee et al. |
| 8,943,069 B2 | 1/2015 | Heumann et al. |
| 8,972,428 B2 | 3/2015 | Dicker et al. |
| 9,021,361 B1 | 4/2015 | Pettinati et al. |
| 9,105,044 B2 | 8/2015 | Wu |
| 9,131,382 B1 | 9/2015 | Johns |
| 9,141,997 B2 | 9/2015 | Gaedcke et al. |
| 9,143,478 B2 | 9/2015 | Ramaswamy |
| 9,229,702 B1 | 1/2016 | Kapulkin et al. |
| 9,251,360 B2 | 2/2016 | Meyer et al. |
| 9,282,098 B1 | 3/2016 | Hitchcock et al. |
| 9,286,102 B1 | 3/2016 | Harel et al. |
| 9,311,683 B1 | 4/2016 | Saylor et al. |
| 9,325,696 B1 | 4/2016 | Balfanz et al. |
| 9,338,186 B2 | 5/2016 | Wollenstein et al. |
| 9,369,454 B2 | 6/2016 | Porzio et al. |
| 9,378,295 B1 | 6/2016 | Marra et al. |
| 9,483,802 B2 | 11/2016 | Gaedcke et al. |
| 9,501,746 B2 | 11/2016 | Prakash |
| 9,509,742 B2 | 11/2016 | Gordon |
| 9,514,459 B1 | 12/2016 | Doshi et al. |
| 9,519,723 B2 | 12/2016 | Lorenz et al. |
| 9,596,206 B2 | 3/2017 | Bueno et al. |
| 9,619,531 B2 | 4/2017 | Wu |
| 9,654,450 B2 | 5/2017 | Ford et al. |
| 9,756,098 B2 | 9/2017 | Kazerani et al. |
| 9,787,664 B1 | 10/2017 | Subbiah et al. |
| 9,800,639 B2 | 10/2017 | Gordon |
| 9,953,063 B2 | 4/2018 | Spasojevic et al. |
| 10,084,838 B2 | 9/2018 | Gordon et al. |
| 10,142,386 B2 | 11/2018 | Gordon |
| 10,178,173 B2 | 1/2019 | Kadowaki et al. |
| 10,180,971 B2 | 1/2019 | Bhave et al. |
| 10,188,905 B2 | 1/2019 | Dohlen |
| 10,204,344 B2 | 2/2019 | Gaedcke et al. |
| 10,204,383 B2 | 2/2019 | Gaedcke et al. |
| 10,264,042 B2 | 4/2019 | Gordon |
| 10,264,073 B2 | 4/2019 | Kadowaki et al. |
| 10,284,723 B1 | 5/2019 | Neuer, III et al. |
| 10,346,449 B2 | 7/2019 | Senftleber et al. |
| 10,417,180 B1 | 9/2019 | Patwardhan |
| 10,430,894 B2 | 10/2019 | Wu |
| 10,489,866 B2 | 11/2019 | Gaedcke et al. |
| 10,491,490 B2 | 11/2019 | Sridhar et al. |
| 10,497,069 B2 | 12/2019 | Gaedcke et al. |
| 10,594,773 B2 | 3/2020 | Falcao et al. |
| 10,601,937 B2 | 3/2020 | Holzband et al. |
| 10,785,222 B2 | 9/2020 | Senftleber et al. |
| 10,855,657 B2 | 12/2020 | Senftleber et al. |
| 10,867,131 B2 | 12/2020 | Scott et al. |
| 10,902,462 B2 | 1/2021 | Savage et al. |
| 10,931,540 B2 | 2/2021 | Davis et al. |
| 10,956,459 B2 | 3/2021 | Senftleber et al. |
| 10,999,278 B2 | 5/2021 | Senftleber et al. |
| 11,050,704 B2 | 6/2021 | Senftleber et al. |
| 11,061,900 B2 | 7/2021 | Falcao et al. |
| 11,087,261 B1 | 8/2021 | Basu et al. |
| 11,122,165 B1 * | 9/2021 | Thiyagarajan ...... H04M 3/5191 |
| 11,481,559 B1 * | 10/2022 | Asefi ..................... G06F 9/543 |
| 2001/0025253 A1 | 9/2001 | Heintz et al. |
| 2001/0037469 A1 | 11/2001 | Gupta et al. |
| 2001/0042087 A1 | 11/2001 | Kephart et al. |
| 2001/0047290 A1 | 11/2001 | Petras et al. |
| 2002/0010746 A1 | 1/2002 | Jilk et al. |
| 2002/0049793 A1 | 4/2002 | Okumura et al. |
| 2002/0070953 A1 | 6/2002 | Barg et al. |
| 2002/0105545 A1 | 8/2002 | Carter et al. |
| 2002/0144156 A1 | 10/2002 | Copeland |
| 2003/0005103 A1 | 1/2003 | Narad et al. |
| 2003/0028525 A1 | 2/2003 | Santos et al. |
| 2003/0078959 A1 | 4/2003 | Yeung et al. |
| 2003/0128203 A1 | 7/2003 | Marshall et al. |
| 2003/0135565 A1 | 7/2003 | Estrada |
| 2003/0187871 A1 | 10/2003 | Amano et al. |
| 2003/0225850 A1 | 12/2003 | Teague |
| 2004/0049673 A1 | 3/2004 | Song et al. |
| 2004/0073666 A1 | 4/2004 | Foster et al. |
| 2004/0133697 A1 | 7/2004 | Mamaghani et al. |
| 2004/0174397 A1 | 9/2004 | Cereghini et al. |
| 2005/0060643 A1 | 3/2005 | Glass et al. |
| 2005/0074126 A1 | 4/2005 | Stanko |
| 2005/0132348 A1 | 6/2005 | Meulemans et al. |
| 2005/0206644 A1 | 9/2005 | Kincaid |
| 2005/0283614 A1 | 12/2005 | Hardt |
| 2006/0010215 A1 | 1/2006 | Clegg et al. |
| 2006/0036685 A1 | 2/2006 | Canning et al. |
| 2006/0129602 A1 | 6/2006 | Witriol et al. |
| 2006/0143307 A1 | 6/2006 | Codignotto |
| 2006/0155581 A1 | 7/2006 | Eisenberger et al. |
| 2006/0185021 A1 | 8/2006 | Dujari et al. |
| 2006/0206578 A1 | 9/2006 | Heidloff et al. |
| 2006/0294196 A1 | 12/2006 | Feirouz et al. |
| 2007/0083536 A1 | 4/2007 | Darnell et al. |
| 2007/0118889 A1 | 5/2007 | Fredell |
| 2007/0136354 A1 | 6/2007 | Chen |
| 2007/0171716 A1 | 7/2007 | Wright et al. |
| 2007/0220029 A1 | 9/2007 | Jones et al. |
| 2007/0226177 A1 | 9/2007 | Barsness et al. |
| 2007/0240119 A1 | 10/2007 | Ducheneaut et al. |
| 2007/0282800 A1 | 12/2007 | England et al. |
| 2007/0286528 A1 | 12/2007 | Podilchuk |
| 2007/0289006 A1 | 12/2007 | Ramachandran et al. |
| 2008/0005284 A1 | 1/2008 | Ungar et al. |
| 2008/0033776 A1 | 2/2008 | Marchese |
| 2008/0034058 A1 | 2/2008 | Korman et al. |
| 2008/0040673 A1 | 2/2008 | Zuckerberg et al. |
| 2008/0103906 A1 | 5/2008 | Singh |
| 2008/0109245 A1 | 5/2008 | Gupta |

(56) References Cited

U.S. PATENT DOCUMENTS

| | | |
|---|---|---|
| 2008/0109491 A1 | 5/2008 | Gupta |
| 2008/0120379 A1 | 5/2008 | Malik |
| 2008/0126476 A1 | 5/2008 | Nicholas et al. |
| 2008/0133488 A1 | 6/2008 | Bandaru et al. |
| 2008/0178125 A1 | 7/2008 | Elsbree et al. |
| 2008/0189406 A1 | 8/2008 | Shen |
| 2008/0201344 A1 | 8/2008 | Levergood et al. |
| 2008/0215591 A1 | 9/2008 | Howard et al. |
| 2008/0221870 A1 | 9/2008 | Attardi et al. |
| 2008/0225848 A1 | 9/2008 | Pilon et al. |
| 2008/0263603 A1 | 10/2008 | Murray et al. |
| 2008/0294680 A1 | 11/2008 | Powell et al. |
| 2008/0306830 A1 | 12/2008 | Lasa et al. |
| 2009/0013043 A1 | 1/2009 | Tan |
| 2009/0043852 A1 | 2/2009 | Weir et al. |
| 2009/0089657 A1 | 4/2009 | Davis |
| 2009/0106080 A1 | 4/2009 | Carrier et al. |
| 2009/0132311 A1 | 5/2009 | Klinger et al. |
| 2009/0138472 A1 | 5/2009 | MacLean |
| 2009/0144723 A1 | 6/2009 | Hartin et al. |
| 2009/0157667 A1 | 6/2009 | Brougher et al. |
| 2009/0157708 A1 | 6/2009 | Bandini et al. |
| 2009/0157899 A1 | 6/2009 | Gagliardi et al. |
| 2009/0158265 A1 | 6/2009 | Davis et al. |
| 2009/0177670 A1 | 7/2009 | Grenier et al. |
| 2009/0181649 A1 | 7/2009 | Bull et al. |
| 2009/0210282 A1 | 8/2009 | Elenbaas et al. |
| 2009/0249451 A1 | 10/2009 | Su et al. |
| 2009/0292608 A1 | 11/2009 | Polachek |
| 2009/0292722 A1 | 11/2009 | Ayloo |
| 2009/0300036 A1 | 12/2009 | Nagasaki |
| 2010/0071052 A1 | 3/2010 | Mao et al. |
| 2010/0082503 A1 | 4/2010 | Kantak et al. |
| 2010/0106730 A1 | 4/2010 | Aminian et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0153516 A1 | 6/2010 | Weinberg et al. |
| 2010/0169148 A1 | 7/2010 | Oberhofer et al. |
| 2010/0174813 A1 | 7/2010 | Hildreth et al. |
| 2010/0205663 A1 | 8/2010 | Ward et al. |
| 2010/0223341 A1 | 9/2010 | Manolescu et al. |
| 2010/0246797 A1 | 9/2010 | Chavez et al. |
| 2010/0250683 A1 | 9/2010 | Hoyne et al. |
| 2010/0257117 A1 | 10/2010 | Shvadron et al. |
| 2010/0274732 A1 | 10/2010 | Grinchenko et al. |
| 2010/0281258 A1 | 11/2010 | Andress et al. |
| 2010/0287512 A1 | 11/2010 | Gan et al. |
| 2010/0293560 A1 | 11/2010 | Bland et al. |
| 2010/0306122 A1 | 12/2010 | Shaffer |
| 2010/0306528 A1 | 12/2010 | Andress et al. |
| 2010/0312769 A1 | 12/2010 | Bailey et al. |
| 2011/0004922 A1 | 1/2011 | Bono et al. |
| 2011/0055217 A1 | 3/2011 | Kamel et al. |
| 2011/0055264 A1 | 3/2011 | Sundelin et al. |
| 2011/0077988 A1 | 3/2011 | Cates et al. |
| 2011/0113041 A1 | 5/2011 | Hawthorne et al. |
| 2011/0119593 A1 | 5/2011 | Jacobson et al. |
| 2011/0125826 A1 | 5/2011 | Erhart et al. |
| 2011/0144801 A1 | 6/2011 | Selker et al. |
| 2011/0153603 A1 | 6/2011 | Adiba et al. |
| 2011/0197146 A1 | 8/2011 | Goto et al. |
| 2011/0212430 A1 | 9/2011 | Smithmier et al. |
| 2011/0219087 A1 | 9/2011 | Jorasch et al. |
| 2011/0246513 A1 | 10/2011 | Covannon et al. |
| 2011/0283366 A1 | 11/2011 | Kwon et al. |
| 2011/0289574 A1 | 11/2011 | Hull et al. |
| 2011/0302653 A1 | 12/2011 | Frantz et al. |
| 2012/0036080 A1 | 2/2012 | Singer et al. |
| 2012/0054135 A1 | 3/2012 | Salaka et al. |
| 2012/0076367 A1 | 3/2012 | Tseng |
| 2012/0077158 A1 | 3/2012 | Jastrzembski et al. |
| 2012/0089706 A1 | 4/2012 | Collins et al. |
| 2012/0095861 A1 | 4/2012 | Feng et al. |
| 2012/0102021 A1 | 4/2012 | Hill et al. |
| 2012/0117059 A1 | 5/2012 | Bailey et al. |
| 2012/0131653 A1 | 5/2012 | Pasquero et al. |
| 2012/0150759 A1 | 6/2012 | Tarjan |
| 2012/0158632 A1 | 6/2012 | Grenier et al. |
| 2012/0195422 A1 | 8/2012 | Famous |
| 2012/0198197 A1 | 8/2012 | Gladwin et al. |
| 2012/0208568 A1 | 8/2012 | Cooley |
| 2012/0210119 A1 | 8/2012 | Baxter et al. |
| 2012/0232953 A1 | 9/2012 | Custer |
| 2012/0254321 A1 | 10/2012 | Lindsay et al. |
| 2012/0265806 A1 | 10/2012 | Blanchflower et al. |
| 2012/0271729 A1 | 10/2012 | Vincelette et al. |
| 2012/0284155 A1 | 11/2012 | Holten et al. |
| 2012/0290605 A1 | 11/2012 | Ickman et al. |
| 2012/0303659 A1 | 11/2012 | Erhart et al. |
| 2012/0317198 A1 | 12/2012 | Patton et al. |
| 2013/0006403 A1 | 1/2013 | Moore et al. |
| 2013/0007121 A1 | 1/2013 | Fontenot et al. |
| 2013/0018957 A1 | 1/2013 | Parnaby et al. |
| 2013/0024522 A1 | 1/2013 | Pierre et al. |
| 2013/0050747 A1 | 2/2013 | Cok et al. |
| 2013/0066876 A1 | 3/2013 | Raskino et al. |
| 2013/0110946 A1 | 5/2013 | Bradshaw |
| 2013/0116044 A1 | 5/2013 | Schwartz |
| 2013/0126042 A1 | 5/2013 | Dewald et al. |
| 2013/0138428 A1 | 5/2013 | Chandramouli et al. |
| 2013/0138742 A1 | 5/2013 | Dziubinski |
| 2013/0159472 A1 | 6/2013 | Newton et al. |
| 2013/0198260 A1 | 8/2013 | Dow et al. |
| 2013/0212349 A1 | 8/2013 | Maruyama |
| 2013/0218801 A1 | 8/2013 | Rago |
| 2013/0218865 A1 | 8/2013 | Angulo et al. |
| 2013/0235069 A1 | 9/2013 | Ubillos et al. |
| 2013/0282417 A1 | 10/2013 | Gaedcke et al. |
| 2013/0282594 A1 | 10/2013 | Gaedcke et al. |
| 2013/0282603 A1 | 10/2013 | Gaedcke et al. |
| 2013/0282722 A1 | 10/2013 | Grenier et al. |
| 2013/0291058 A1 | 10/2013 | Wollenstein et al. |
| 2013/0298038 A1 | 11/2013 | Spivack et al. |
| 2013/0304726 A1 | 11/2013 | Sandulescu et al. |
| 2013/0304758 A1 | 11/2013 | Gruber et al. |
| 2013/0318156 A1 | 11/2013 | Friedman et al. |
| 2013/0332262 A1 | 12/2013 | Hunt et al. |
| 2013/0332263 A1 | 12/2013 | Vora et al. |
| 2013/0346872 A1 | 12/2013 | Scott et al. |
| 2014/0006524 A1 | 1/2014 | Singh et al. |
| 2014/0032306 A1 | 1/2014 | Sukornyk et al. |
| 2014/0040275 A1 | 2/2014 | Dang et al. |
| 2014/0040377 A1 | 2/2014 | Friedman et al. |
| 2014/0040993 A1 | 2/2014 | Lorenzo et al. |
| 2014/0047429 A1 | 2/2014 | Gaither et al. |
| 2014/0067520 A1 | 3/2014 | Campanile |
| 2014/0074844 A1 | 3/2014 | Subramanian et al. |
| 2014/0075004 A1 | 3/2014 | Dusen et al. |
| 2014/0082072 A1 | 3/2014 | Kass et al. |
| 2014/0108675 A1 | 4/2014 | Wu |
| 2014/0164352 A1 | 6/2014 | Denninghoff |
| 2014/0173444 A1 | 6/2014 | Wu |
| 2014/0173501 A1 | 6/2014 | Wu |
| 2014/0173509 A1 | 6/2014 | Wu |
| 2014/0181087 A1 | 6/2014 | Wu |
| 2014/0181194 A1 | 6/2014 | Sullivan |
| 2014/0181728 A1 | 6/2014 | Wu |
| 2014/0184841 A1 | 7/2014 | Woo et al. |
| 2014/0189808 A1 | 7/2014 | Mahaffey et al. |
| 2014/0200989 A1 | 7/2014 | Kassko et al. |
| 2014/0222834 A1 | 8/2014 | Parikh et al. |
| 2014/0223527 A1 | 8/2014 | Bortz et al. |
| 2014/0244621 A1 | 8/2014 | Lindsay |
| 2014/0278785 A1 | 9/2014 | Gaedcke et al. |
| 2014/0280113 A1 | 9/2014 | Hohwald |
| 2014/0280398 A1 | 9/2014 | Smith et al. |
| 2014/0289034 A1 | 9/2014 | Wu |
| 2014/0298199 A1 | 10/2014 | Johnson, Jr. et al. |
| 2014/0304249 A1 | 10/2014 | Ayzenshtat et al. |
| 2014/0324902 A1 | 10/2014 | Morris et al. |
| 2014/0337953 A1 | 11/2014 | Banatwala et al. |
| 2014/0358911 A1 | 12/2014 | McCarthy et al. |
| 2015/0006708 A1 | 1/2015 | Banke et al. |

(56) References Cited

U.S. PATENT DOCUMENTS

| | | |
|---|---|---|
| 2015/0032492 A1 | 1/2015 | Ting et al. |
| 2015/0032751 A1 | 1/2015 | Ting et al. |
| 2015/0039705 A1 | 2/2015 | Kursun |
| 2015/0067160 A1 | 3/2015 | Sridhar et al. |
| 2015/0095307 A1 | 4/2015 | Bensberg et al. |
| 2015/0100537 A1 | 4/2015 | Grieves et al. |
| 2015/0112918 A1 | 4/2015 | Zheng et al. |
| 2015/0120713 A1 | 4/2015 | Kim et al. |
| 2015/0127453 A1 | 5/2015 | Tew et al. |
| 2015/0134457 A1 | 5/2015 | Cheung et al. |
| 2015/0134579 A1 | 5/2015 | Zaman et al. |
| 2015/0142748 A1 | 5/2015 | Gottemukkula et al. |
| 2015/0161211 A1 | 6/2015 | Patel et al. |
| 2015/0170294 A1 | 6/2015 | Goyal et al. |
| 2015/0188907 A1 | 7/2015 | Khalid et al. |
| 2015/0193504 A1 | 7/2015 | Naidu et al. |
| 2015/0244706 A1 | 8/2015 | Grajek et al. |
| 2015/0281227 A1 | 10/2015 | Ivey et al. |
| 2015/0286643 A1 | 10/2015 | Kumar et al. |
| 2015/0288522 A1 | 10/2015 | McCoy et al. |
| 2015/0295869 A1 | 10/2015 | Li et al. |
| 2015/0310018 A1 | 10/2015 | Fan et al. |
| 2015/0310020 A1 | 10/2015 | Brav et al. |
| 2015/0310571 A1 | 10/2015 | Brav et al. |
| 2015/0312200 A1 | 10/2015 | Brav et al. |
| 2015/0334102 A1 | 11/2015 | Haugsnes |
| 2015/0347616 A1 | 12/2015 | Levi et al. |
| 2015/0381552 A1 | 12/2015 | Vijay et al. |
| 2016/0019628 A1 | 1/2016 | Udumudi et al. |
| 2016/0021097 A1 | 1/2016 | Shrotri |
| 2016/0034551 A1 | 2/2016 | Huang et al. |
| 2016/0042053 A1 | 2/2016 | Webber |
| 2016/0055250 A1 | 2/2016 | Rush |
| 2016/0055541 A1 | 2/2016 | Calistri-Yeh |
| 2016/0057576 A1 | 2/2016 | Kessler et al. |
| 2016/0073166 A1 | 3/2016 | Hu et al. |
| 2016/0080445 A1 | 3/2016 | Kazerani et al. |
| 2016/0110688 A1 | 4/2016 | Knox et al. |
| 2016/0125157 A1 | 5/2016 | Wu |
| 2016/0132904 A1 | 5/2016 | Mondal et al. |
| 2016/0132973 A1 | 5/2016 | Wu |
| 2016/0134580 A1 | 5/2016 | Castera et al. |
| 2016/0147760 A1 | 5/2016 | Anandhavelu et al. |
| 2016/0151704 A1 | 6/2016 | Wu |
| 2016/0164863 A1 | 6/2016 | Hitchcock et al. |
| 2016/0203221 A1 | 7/2016 | Rao et al. |
| 2016/0203523 A1 | 7/2016 | Spasojevic et al. |
| 2016/0210555 A1 | 7/2016 | Murphy et al. |
| 2016/0212100 A1 | 7/2016 | Banerjee |
| 2016/0255034 A1 | 9/2016 | Yuan |
| 2016/0269344 A1 | 9/2016 | Anders et al. |
| 2016/0320926 A1 | 11/2016 | Ganin et al. |
| 2016/0321261 A1 | 11/2016 | Spasojevic et al. |
| 2016/0321562 A1 | 11/2016 | Zeng |
| 2016/0321694 A1 | 11/2016 | Vorozhtsov |
| 2016/0335572 A1 | 11/2016 | Bennett et al. |
| 2016/0352667 A1 | 12/2016 | Pickett et al. |
| 2017/0046112 A1 | 2/2017 | Keller et al. |
| 2017/0048237 A1 | 2/2017 | Pfitzmann et al. |
| 2017/0061248 A1 | 3/2017 | Ryan, Jr. et al. |
| 2017/0072321 A1* | 3/2017 | Thompson ............... A63F 13/61 |
| 2017/0132276 A1 | 5/2017 | Saurabh et al. |
| 2017/0154356 A1 | 6/2017 | Trevisiol et al. |
| 2017/0154366 A1 | 6/2017 | Turgeman |
| 2017/0177562 A1 | 6/2017 | Scott et al. |
| 2017/0180294 A1 | 6/2017 | Milligan et al. |
| 2017/0193546 A1 | 7/2017 | Bennett et al. |
| 2017/0242913 A1* | 8/2017 | Tijssen ................. G06F 40/279 |
| 2017/0255536 A1 | 9/2017 | Weissinger et al. |
| 2017/0264619 A1 | 9/2017 | Narayanaswamy et al. |
| 2017/0300490 A1 | 10/2017 | Kachemir et al. |
| 2017/0344748 A1 | 11/2017 | Ghani et al. |
| 2017/0366636 A1 | 12/2017 | Wang et al. |
| 2018/0027075 A1 | 1/2018 | Schoeffler et al. |
| 2018/0041336 A1 | 2/2018 | Keshava et al. |
| 2018/0053114 A1 | 2/2018 | Adjaoute |
| 2018/0081983 A1 | 3/2018 | Carru et al. |
| 2018/0091468 A1 | 3/2018 | Yong et al. |
| 2018/0097802 A1 | 4/2018 | Lander et al. |
| 2018/0115473 A1 | 4/2018 | Sridhar et al. |
| 2018/0144389 A1 | 5/2018 | Fredrich et al. |
| 2018/0152471 A1 | 5/2018 | Jakobsson |
| 2018/0211285 A1 | 7/2018 | Todasco et al. |
| 2018/0219830 A1 | 8/2018 | O'Brien et al. |
| 2018/0267951 A1 | 9/2018 | Moah et al. |
| 2018/0278503 A1 | 9/2018 | Carey et al. |
| 2018/0293607 A1 | 10/2018 | Huddleston et al. |
| 2018/0295137 A1 | 10/2018 | Zager et al. |
| 2018/0308473 A1* | 10/2018 | Scholar ................... A63F 13/00 |
| 2018/0329565 A1 | 11/2018 | Yeung et al. |
| 2018/0332079 A1 | 11/2018 | Ashley et al. |
| 2018/0337871 A1 | 11/2018 | Matta et al. |
| 2018/0337907 A1 | 11/2018 | Bhansali et al. |
| 2018/0337910 A1 | 11/2018 | Gustavson et al. |
| 2018/0367484 A1 | 12/2018 | Rodriguez et al. |
| 2018/0374374 A1 | 12/2018 | Watson et al. |
| 2019/0057204 A1 | 2/2019 | Marcovecchio et al. |
| 2019/0114356 A1 | 4/2019 | Senftleber et al. |
| 2019/0116137 A1 | 4/2019 | Senftleber et al. |
| 2019/0116148 A1 | 4/2019 | Senftleber et al. |
| 2019/0158610 A1 | 5/2019 | Holzband et al. |
| 2019/0159166 A1 | 5/2019 | Aggarwal et al. |
| 2019/0228093 A1 | 7/2019 | Falcao et al. |
| 2019/0230151 A1 | 7/2019 | Falcao et al. |
| 2019/0245751 A1 | 8/2019 | Wong |
| 2019/0306248 A1 | 10/2019 | Swarangi et al. |
| 2019/0347984 A1 | 11/2019 | Hintermeister |
| 2019/0354709 A1 | 11/2019 | Brinskelle |
| 2019/0377790 A1* | 12/2019 | Redmond ............. G06F 40/205 |
| 2020/0005118 A1* | 1/2020 | Chen ................... G06F 16/3329 |
| 2020/0007474 A1* | 1/2020 | Zhang ...................... G09B 7/02 |
| 2020/0007530 A1 | 1/2020 | Abdul et al. |
| 2020/0051120 A1 | 2/2020 | Senftleber et al. |
| 2020/0053094 A1 | 2/2020 | Kaube et al. |
| 2020/0099676 A1 | 3/2020 | Desarda et al. |
| 2020/0104478 A1 | 4/2020 | Chauhan |
| 2020/0120068 A1 | 4/2020 | Senftleber et al. |
| 2020/0120095 A1 | 4/2020 | Senftleber et al. |
| 2020/0120096 A1 | 4/2020 | Senftleber et al. |
| 2020/0120167 A1 | 4/2020 | Senftleber et al. |
| 2020/0143797 A1* | 5/2020 | Manoharan ............. G10L 15/22 |
| 2020/0151829 A1 | 5/2020 | Wu |
| 2020/0184575 A1 | 6/2020 | Gaedcke et al. |
| 2020/0192976 A1* | 6/2020 | Swamypillai ........... H04L 51/02 |
| 2020/0238952 A1* | 7/2020 | Lindsay ................ G06V 30/194 |
| 2020/0258091 A1 | 8/2020 | Gaedcke et al. |
| 2020/0287957 A1 | 9/2020 | Falcao et al. |
| 2020/0329110 A1 | 10/2020 | Holzband et al. |
| 2020/0358755 A1 | 11/2020 | Abdul et al. |
| 2020/0366564 A1 | 11/2020 | Davis et al. |
| 2021/0119967 A1 | 4/2021 | Senftleber et al. |
| 2021/0133763 A1* | 5/2021 | Adibi ..................... G10L 15/26 |
| 2021/0174391 A1 | 6/2021 | Savage et al. |
| 2021/0176136 A1 | 6/2021 | Davis et al. |
| 2021/0226952 A1 | 7/2021 | Senftleber et al. |
| 2021/0250341 A1 | 8/2021 | Senftleber et al. |
| 2021/0256041 A1 | 8/2021 | Senftleber et al. |
| 2021/0266724 A1* | 8/2021 | Gray ..................... H04M 3/42008 |
| 2021/0328961 A1 | 10/2021 | Senftleber et al. |
| 2021/0350209 A1* | 11/2021 | Wang ...................... G06F 16/63 |
| 2021/0357408 A1 | 11/2021 | Falcao et al. |
| 2021/0382925 A1* | 12/2021 | Fincun ................... G06F 40/35 |
| 2022/0245361 A1* | 8/2022 | Narendula ............. G06F 40/295 |
| 2023/0020613 A1* | 1/2023 | Drory .................. H04M 3/5191 |
| 2023/0024507 A1* | 1/2023 | Bhattacherjee ......... G10L 15/22 |
| 2023/0188480 A1* | 6/2023 | Menon ................... G06N 3/006<br>709/206 |
| 2023/0206004 A1* | 6/2023 | Gadde .................... G06F 40/35<br>704/9 |
| 2023/0252975 A1* | 8/2023 | Vishnoi .................. G10L 13/08<br>704/260 |

(56) References Cited

U.S. PATENT DOCUMENTS

FOREIGN PATENT DOCUMENTS

| | | |
|---|---|---|
| EP | 2857993 B1 | 8/2017 |
| WO | 2009047674 A2 | 4/2009 |
| WO | 2013158839 A1 | 10/2013 |
| WO | 2014089460 A2 | 6/2014 |
| WO | 2014153463 A3 | 1/2015 |
| WO | 2015013436 A2 | 1/2015 |
| WO | 2019075284 A2 | 4/2019 |
| WO | 2019144159 A1 | 7/2019 |
| WO | 2020232311 A1 | 11/2020 |

OTHER PUBLICATIONS

Ahmed, Saba, Final Office Action mailed Jun. 29, 2016 for U.S. Appl. No. 14/098,492.

Ahmed, Saba, Non-Final Office Action mailed Nov. 19, 2015 for U.S. Appl. No. 14/098,492.

Anicas, Mitchell; An Introduction to OAuth 2, DigitalOcean, Published Jul. 21, 2014, Retrieved Jan. 29, 2021; URL: https://www.digitalocean.com/community/tutorials/an-introduction-to-oauth-2#oauth-roles.

Antoniades et al., "we.b: The web of short URLs," Apr. 2011, Proceedings of the 20th International Conference on World Wide Web, Mar. 28-Apr. 1, 2011, Hyderabad, India, pp. 715-724 (Year: 2011).

Arentz et al., Classifying offensive sites based on image content [online], Computer Vision and Image Understanding 94, 295-310, 2004, Retrieved from the Internet: https://www.sciencedirect.com/science/article/abs/pii/S1077314203001875.

Bista, Sanat Kumar et al., "Using Gamification in an Online Community," CSIRO ITC Centre, Conference Paper, 2012.

Blaufeld, Justin R., Final Office Action mailed Mar. 24, 2016 for U.S. Appl. No. 14/098,501.

Blaufeld, Justin R., Non-Final Office Action mailed Sep. 24, 2015 for U.S. Appl. No. 14/098,501.

Bostock, Mike, Sankey Diagram, available at http://bost.ocks.org/mike/sankey, published May 21, 2012, 1 pg.

Brown Jr., Nathan H., Final Office Action mailed Mar. 29, 2011 for U.S. Appl. No. 11/971,856.

Brown Jr., Nathan H., Non-Final Office Action mailed Jun. 6, 2012 for U.S. Appl. No. 13/167,482.

Brown Jr., Nathan H., Non-Final Office Action mailed Mar. 24, 2014 for U.S. Appl. No. 13/780,487.

Brown Jr., Nathan H., Non-Final Office Action mailed Nov. 26, 2010 for U.S. Appl. No. 11/971,856.

Bui, Hanh Thi Minh, Non-Final Office Action mailed Mar. 13, 2015 for U.S. Appl. No. 14/012,978.

Cannell, Larry, "Windows 7 Federated Search and SharePoint 2010" online article dated Jun. 2010 <http://blogs.gartner.com/larry-cannell/2010/09/09/windows-7-federated-search-and-sharepoint-2010/[May 13, 2016 12:36:15 PM].

Chung, Mong-Shune, Non-Final Office Action mailed Jan. 29, 2016 for U.S. Appl. No. 14/098,505.

Constine, Josh, "Facebook tests notification unsubscribe button for feed posts," Aug. 9, 2010. http://www.adweek.com/socialtime/unsubscribe-button-posts/244868.

Dagnew, Saba, Final Office Action mailed Feb. 12, 2020 for U.S. Appl. No. 15/581,795.

Dagnew, Saba, Non-Final Office Action for U.S. Appl. No. 15/581,795 mailed Sep. 16, 2019.

Dinh, Khanh Q., Non-Final Office Action mailed Mar. 17, 2021 for U.S. Appl. No. 16/820,697.

Dinh, Khanh Q., Notice of Allowance and Fee(s) Due mailed Apr. 16, 2021 for U.S. Appl. No. 16/820,697.

Dinh, Khanh Q., Notice of Allowance and Fee(s) Due mailed Oct. 29, 2019 for U.S. Appl. No. 15/877,379.

Dwyer, Cameron, "Five out-of-the-box ways to get Email into SharePoint" Jan. 2012, <https://camerondwyer.wordpress.com/2012/09/04/five-out-of-the-box-ways-to-get-email-into-sharepoint/[May 13, 2016 10:48:43 AM].

Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.

Falcao et al., U.S. Appl. No. 15/877,379, filed Jan. 22, 2018 and entitled, "Temporal Optimization of Data Operations Using Distributed Search and Server Management."

Falcao et al., U.S. Appl. No. 15/877,381, filed Jan. 22, 2018 and entitled, "Temporal Optimization of Data Operations Using Distributed Search and Server Management."

Fett et al., The Web SSO Standard OpenID Connect: In-Depth Formal Security Analysis and Security Guidelines, 2017 IEEE 30th Computer Security Foundations Symposium (Year: 2017).

Filipczyk, Marcin R., Final Office Action mailed Oct. 5, 2015 for U.S. Appl. No. 13/950,268.

Filipczyk, Marcin R., Non-Final Office Action mailed Mar. 10, 2016 for U.S. Appl. No. 13/950,268.

Filipczyk, Marcin R., Non-Final Office action mailed May 22, 2015 for U.S. Appl. No. 13/950,268.

Fiorillo, James N., Final Office Action mailed Sep. 27, 2021 for U.S. Appl. No. 16/827,625.

Fiorillo, James N., Non-Final Office Action for U.S. Appl. No. 15/821,543 mailed Aug. 16, 2019.

Fiorillo, James N., Non-Final Office Action mailed Jun. 7, 2021 for U.S. Appl. No. 16/827,625.

Fiorillo, James N., Notice of Allowance and Fee(s) Due mailed Nov. 14, 2019 for U.S. Appl. No. 15/821,543.

Friedman et al., U.S. Appl. No. 61/650,849, filed May 23, 2012 and entitled, "Dynamic Information Streams in a Social Network Platform."

Frunzi, Victoria E., Final Office Action mailed May 17, 2021 for U.S. Appl. No. 16/590,218.

Frunzi, Victoria E., Non-Final Office Action mailed Dec. 21, 2020 for U.S. Appl. No. 16/590,218.

Frunzi, Victoria E., Non-Final Office Action mailed Oct. 16, 2018 for U.S. Appl. No. 15/018,787.

Gaedckle et al., U.S. Appl. No. 61/636,132, filed Apr. 20, 2012 and entitled, "System and Method for Providing a Social Customer Care System."

Georgandellis, Andrew C., Final Office Action mailed Mar. 30, 2016 for U.S. Appl. No. 13/900,878.

Goldberg, Ivan R., Non-Final Office Action mailed Jun. 20, 2014 for U.S. Appl. No. 13/865,411.

Goldberg, Ivan R., Non-Final Office Action mailed Jun. 23, 2014 for U.S. Appl. No. 13/865,429.

Goldberg, Ivan R., Non-Final Office Action mailed Mar. 10, 2021 for U.S. Appl. No. 16/695,098.

Goldberg, Ivan R., Non-Final Office Action mailed Mar. 3, 2021 for U.S. Appl. No. 16/701,143.

Hardt, Dick, The OAuth 2.0 Authorization Framework draft-ieft-oauth-v2-31; Internet Engineering Task Force (IEFT) (Year: 2012).

Hashemi, Mazdak, "The Infrastructure Behind Twitter: Scale", Jan. 19, 2017, Twitter, Inc. Blog Post, https://blog.twitter.com/engineering/en_us/topics/infrastructure/2017/the-infrastructure-behind-twitter-scale.html.

Hatcher, Deirdre D., Non-Final Office Action mailed Jan. 14, 2016 for U.S. Appl. No. 13/950,258.

Holzband et al., U.S. Appl. No. 15/821,543, filed Nov. 22, 2017 and entitled, "Responsive Action Prediction Based On Electronic Messages Among a System of Networked Computing Devices."

Jang, Gijeong, Written Opinion of the International Searching Authority and International Search Report mailed Jul. 28, 2015 for International Patent Application No. PCT/US2014/047866.

Jou et al., "Predicting Viewer Perceived Emotions in Animated GIFs", Nov. 3-7, 2014 (4 pages).

Kim, Harry C., Notification of Transmittal of the International Search Report and the Written Opinion of the International Search-

(56) References Cited

OTHER PUBLICATIONS ing Authority, or the Declaration mailed Sep. 16, 2020 for International Patent Application No. PCT/US2020/032999.
Kolosowski-Gager, Katherine, Final Office Action mailed Feb. 11, 2019 for U.S. Appl. No. 14/627,151.
Kolosowski-Gager, Katherine, Non-Final Office Action mailed Jun. 29, 2018 for U.S. Appl. No. 14/627,151.
Leimeister et al., "Success factors of virtual communities from the perspective of members and operators: An empirical study," Proceedings of the 37th Hawaii International Conference on Systems Sciences 2004, IEEE, pp. 1-10 (Year: 2004).
Lithium Technologies. "Community Health Index for Online Communities." 2009, https://www.lithium.com/pdfs/whitepapers/Lithium-Community-Health-Index_v1AY2ULb.pdf. Retrieved from the Internet Wayback Machine, dated Feb. 19, 2011.
Lithium Website, http://www.lithium.com, Dec. 11, 2010, retrieved from Internet Archive, pp. 1-9.
Liu et al., OAuth Based Authentication and Authorization in Open Telco API; International Conference on Computer Science and Electronics Engineering, 2012 (Year: 2012).
M. Rowe and H. Alani, "What Makes Communities Tick? Community Health Analysis Using Role Compositions," 2012 International Conference on Privacy, Security, Risk and Trust and 2012 International Conference on Social Computing, Amsterdam, Netherlands, 2012, pp. 267-276, doing: 10.1109/SocialCom-PASSAT2012. 18.
M2 PressWire, "Alterian: Social media monitoring and analytics comes of age with Alterian's acquisition of market leader Techrigy," Jul. 15, 2009, Anonymous, Norman Media Ltd, London.
Matthews, Tara, et al. "Community Insights: Helping Community Leaders Enhance the Value of Enterprise Online Communities." Proceedings of the SIGCHI Conference on Human Factors in Computing Systems, Apr. 27-May 2, 2013, Paris, France. ACM (2013). pp. 513-522.
Meng, Jau Shya, Non-Final Office Action mailed Jan. 3, 2020 for U.S. Appl. No. 15/877,381.
Meng, Jau Shya, Non-Final Office Action mailed Jun. 16, 2020 for U.S. Appl. No. 15/877,381.
Mesa, Joel, Final Office Action mailed Mar. 30, 2020 for U.S. Appl. No. 15/782,635.
Mesa, Joel, Non-Final Office Action for U.S. Appl. No. 15/782,635 mailed Oct. 4, 2019.
Mesa, Joel, Non-Final Office Action mailed Oct. 6, 2020 for U.S. Appl. No. 15/782,635.
Mesa, Joel, Notice of Allowance and Fee(s) Due mailed Feb. 24, 2021 for U.S. Appl. No. 15/782,635.
Mosley, Kyle T., Non-Final Office Action mailed Dec. 28, 2017 for U.S. Appl. No. 14/852,965.
Mosley, Kyle T., Non-Final Office Action mailed Oct. 4, 2017 for U.S. Appl. No. 14/627,151.
Nano, Sargon N., Notice of Allowance and Fee(s) Due mailed May 19, 2021 for U.S. Appl. No. 17/026,152.
Netzloff, Eric R., Non-Final Office Action mailed Nov. 25, 2014 for U.S. Appl. No. 13/848,706.
Netzloff, Eric R., Non-Final Office Action mailed Nov. 6, 2018 for U.S. Appl. No. 14/824,021.
Neuman, Clifford B., Proxy-Based Authorization and Accounting for Distributed Systems, IEEE 1993 (Year: 1993).
Niruntasukrat et al., Authorization Mechanism for MQTT-based Internet of Things, IEEE ICC 2016 Workshops: W07-Workshop on Convergent Internet of Things (Year: 2016).
Ofori-Awuah, Maame, Final Office Action mailed Oct. 2, 2020 for U.S. Appl. No. 14/929,209.
Ofori-Awuah, Maame, Final Office Action mailed Sep. 6, 2019 for U.S. Appl. No. 14/929,209.
Ofori-Awuah, Maame, Non-Final Office Action mailed Apr. 5, 2019 for U.S. Appl. No. 14/929,209.
Ofori-Awuah, Maame, Non-Final Office Action mailed Sep. 28, 2021 for U.S. Appl. No. 14/929,209.
Oh, Eung Gie, Written Opinion of the International Searching Authority and International Search Report mailed Nov. 18, 2014 for International Patent Application No. PCT/US2014/031345.
Olshannikov, Alex, Final Office Action mailed Apr. 15, 2016 for U.S. Appl. No. 14/098,480.
Olshannikov, Alex, Final Office Action mailed Feb. 17, 2016 for U.S. Appl. No. 14/098,509.
Olshannikov, Alex, Non-Final Office Action mailed Nov. 5, 2015 for U.S. Appl. No. 14/098,480.
Olshannikov, Alex, Non-Final Office Action mailed Oct. 22, 2015 for U.S. Appl. No. 14/098,509.
Perungavoor, Venkatanaray, Notice of Allowance and Fee(s) Due for U.S. Appl. No. 16/158,167, mailed May 15, 2020.
Raju, "5 Ways to Tweet More Than 140 Characters," Dec. 28, 2008, Technically Personal, http://www.techpp.com/2008/12/28/5-ways-to-tweet-more-than-140-characters/, retrieved from Internet Archive version from Mar. 3, 2011.
Rao et U.S. Appl. No. 62/049,642, filed Sep. 12, 2014 and entitled, "System and Apparatus for an Application Agnostic User Search Engine."
Rashid, Ishrat, Final Office Action for U.S. Appl. No. 15/782,653 mailed Sep. 19, 2019.
Rashid, Ishrat, Final Office Action mailed Jun. 15, 2021 for U.S. Appl. No. 15/782,653.
Rashid, Ishrat, Non-Final Office Action mailed Apr. 2, 2021 for U.S. Appl. No. 15/782,653.
Rashid, Ishrat, Non-Final Office Action mailed Jun. 11, 2019 for U.S. Appl. No. 15/782,653.
Rashid, Ishrat, Non-Final Office Action mailed Jun. 12, 2020 for U.S. Appl. No. 15/782,653.
Senftleber et al., International (PCT) Patent Application No. PCT/US2018/055545, filed Oct. 12, 2018 and entitled, "Predicting Performance of Content and Electronic Messages Among a System of Networked Computing Devices."
Senftleber et al., U.S. Appl. No. 15/782,635, filed Oct. 12, 2017 and entitled, "Computerized Tools to Enhance Speed and Propagation of Content in Electronic Messages Among a System of Networked Computing Devices."
Senftleber et al., U.S. Appl. No. 15/782,642, filed Oct. 12, 2017 and entitled, "Predicting Performance of Content and Electronic Messages Among a System of Networked Computing Devices."
Senftleber et al., U.S. Appl. No. 15/782,653, filed Oct. 12, 2017 and entitled, "Optimizing Effectiveness of Content in Electronic Messages Among a System of Networked Computing Device."
Senftleber et al., U.S. Appl. No. 16/158, 167, filed Oct. 11, 2018 and entitled, "Credential and Authentication Management in Scalable Data Networks."
Senftleber et al., U.S. Appl. No. 16/158,169, filed Oct. 11, 2018 and entitled, "Native Activity Tracking Using Credential and Authentication Management in Scalable Data Networks."
Senftleber et al., U.S. Appl. No. 16/158,172, filed Oct. 11, 2018 and entitled, "Proxied Multi-Factor Authentication Using Credential and Authentication Management in Scalable Data Networks."
Senftleber et al., U.S. Appl. No. 16/194,126, filed Nov. 16, 2018 and entitled, "Multiplexed Data Exchange Portal Interface in Scalable Data Networks."
Shaw, Robert A., Final Office Action mailed Mar. 16, 2021 for U.S. Appl. No. 16/158,169.
Shaw, Robert A., Non-Final Office Action mailed Jan. 22, 2021 for U.S. Appl. No. 16/158,169.
Singh, Amardeep, IP Australia, Examination Report No. 1 for Australia Patent Application No. 2019209542 mailed Dec. 17, 2020.
Spasojevic et al., U.S. Appl. No. 61/943,047, filed Feb. 21, 2014 and entitled, "Domain Generic Large Scale Topic Expertise & Interest Mining Across Multiple Online Social Networks."
Spasojevic, Nemanja et al., "When-To-Post on Social Networks", International Conference on Knowledge Discovery and Data Mining (KDD), Aug. 10-13, 2015, pp. 2127-2136, Retrieved Online: http://dl.acm.org/citation.cfm?d=2788584.
Suh, Andrew, Final Office Action mailed Dec. 3, 2020 for U.S. Appl. No. 16/158,172.
Suh, Andrew, Non-Final Office Action mailed Jul. 8, 2020 for U.S. Appl. No. 16/158,172.

(56) References Cited

OTHER PUBLICATIONS

Tabor, Amare F., Final Office Action mailed Apr. 8, 2015 for U.S. Appl. No. 13/871,076.
Tabor, Amare F., Non-Final Office Action mailed Aug. 15, 2014 for U.S. Appl. No. 13/871,076.
Takesue, Masaru, An HTTP Extension for Secure Transfer of Confidential Data, 2009 IEEE International Conference on Networking, Architecture, and Storage, Hunan, 2009, pp. 101-108, doi: 10.1109/NAS.2009.21.
Thomas, Shane, Written Opinion of the International Searching Authority and International Search Report mailed Aug. 16, 2013 for International Patent Application No. PCT/US2013/037107.
Trapanese, William C., Non-Final Office Action mailed May 27, 2020 for U.S. Appl. No. 16/413,577.
U.S. Appl. No. 11/333,826, filed Jan. 17, 2006 and entitled, "Knowledge Filter".
U.S. Appl. No. 11/692,169, filed Mar. 27, 2007 and entitled, "Knowledge Filter".
U.S. Appl. No. 60/158,496, filed Oct. 8, 1999 and entitled, "Knowledge Filter".
U.S. Appl. No. 60/816,100, filed Jun. 22, 2006 and entitled, "Knowledge Filter".
U.S. Appl. No. 60/816,900, filed Jun. 26, 2006 and entitled, "Knowledge Filter".
Vo, Huyen X., Non-Final Office Action mailed Mar. 15, 2019 for U.S. Appl. No. 15/782,642.
Vo, Huyen X., Non-Final Office Action mailed Oct. 15, 2020 for U.S. Appl. No. 16/458,183.
Walsh, John B., Non-Final Office Action mailed Mar. 24, 2017 for U.S. Appl. No. 14/702,696.
Wang, Xiaoqing, and Shannon Lantzy. "A Systematic Examination of Member Turnover and Online Community Health." Thirty Second International Conference on Information Systems, Shanghai (2011), pp. 1-11.
Wollenstein et al., U.S. Appl. No. 61/639,509, filed Apr. 27, 2012 and entitled, "Systems and Methods for Implementing Custom Privacy Settings."
Wu, Michael, U.S. Appl. No. 61/734,927, filed Dec. 7, 2012 and entitled, "Systems and Methods for Presenting Analytic Data."
Wu, Michael, U.S. Appl. No. 62/072,929, filed Oct. 30, 2014 and entitled, "Systems and Methods to Monitor Health of Online Social Communities."
Young, Lee W., Notification of Transmittal of the International Search Report and the Written Opinion of the International Searching Authority, or the Declaration, mailed Apr. 1, 2019 for International Application No. PCT/US2018/05545.
Young, Lee W., Written Opinion of the International Searching Authority and International Search Report mailed May 28, 2014 for International Patent Application No. PCT/US2013/073625.
Young, Lee W.; Notification of Transmittal of the International Search Report and the Written Opinion of the International Searching Authority, or the Declaration mailed Jun. 24, 2019 for International Application No. PCT/US2019/014637.
Georgandellis, Andrew C., Final Office Action mailed Oct. 26, 2017 for U.S. Appl. No. 13/900,878.
Georgandellis, Andrew C., Final Office Action mailed Sep. 21, 2016 for U.S. Appl. No. 14/035,166.
Georgandellis, Andrew C., Non-Final Office Action mailed Jan. 26, 2017 for U.S. Appl. No. 13/900,878.
Goldberg, Ivan R., Final Office Action mailed Jan. 15, 2015 for U.S. Appl. No. 13/865,429.
Goldberg, Ivan R., Final Office Action mailed Jun. 29, 2021 for U.S. Appl. No. 16/695,098.
Goldberg, Ivan R., Final Office Action mailed Jun. 29, 2021 for U.S. Appl. No. 16/701,143.
Goldberg, Ivan R., Non-Final Office Action mailed Apr. 13, 2016 for U.S. Appl. No. 13/865,429.
Goldberg, Ivan R., Non-Final Office Action mailed Jun. 18, 2014 for U.S. Appl. No. 13/835,250.
Goldberg, Ivan R., Non-Final Office Action mailed Jun. 18, 2014 for U.S. Appl. No. 13/835,502.
Georgandellis, Andrew C., Non-Final Office Action mailed Jul. 11, 2016 for U.S. Appl. No. 14/035,166.
Georgandellis, Andrew C., Non-Final Office Action mailed May 23, 2017 for U.S. Appl. No. 14/035,166.
Georgandellis, Andrew C., Non-Final Office Action mailed Nov. 3, 2015 for U.S. Appl. No. 13/900,878.
Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.
Goldberg, Ivan R., Final Office Action mailed Jan. 12, 2015 for U.S. Appl. No. 13/835,502.
Goldberg, Ivan R., Final Office Action mailed Jan. 13, 2015 for U.S. Appl. No. 13/835,250.
European Patent Office, Extended European Search Report mailed Nov. 12, 2021 for European Patent Application No. 19741372.7.
Fiorillo, James N., Notice of Allowance and Fee(s) Due mailed Nov. 24, 2021 for U.S. Appl. No. 16/827,625.
Kim, Harry, Notification of Transmittal of the International Search Report and the Written Opinion of the International Searching Authority, or the Declaration, mailed Jan. 11, 2022 for International Application No. PCT/US2021/050979.
Rashid, Ishrat, Non-Final Office Action mailed Dec. 22, 2021 for U.S. Appl. No. 15/782,653.
Shaw, Robert A., Non-Final Office Action mailed Dec. 27, 2021 for U.S. Appl. No. 16/158,169.

* cited by examiner

AUTOMATED PREDICTIVE RESPONSE COMPUTING PLATFORM IMPLEMENTING ADAPTIVE DATA FLOW SETS TO EXCHANGE DATA VIA AN OMNICHANNEL ELECTRONIC COMMUNICATION CHANNEL INDEPENDENT OF DATA SOURCE

FIELD

Various embodiments relate generally to data science and data analysis, computer software and systems, and control systems to provide a platform to implement automated responses to data representing electronic messages, among other things, and, more specifically, to a computing and data platform that implements logic to facilitate implementation of an automated predictive response computing system independent of electronic communication channel or linguistic language of an electronic message payload, the automated predictive response computing system being configured to implement, for example, adaptive data flow sets to automatically adapt a flow of responses responsive to, for example, classification of an electronic message.

BACKGROUND

Advances in computing hardware and software have fueled exponential growth in delivery of vast amounts of information due to increased improvements in computational and networking technologies. Also, advances in conventional data network technologies provide an ability to exchange increasing amounts of generated data via various electronic messaging platforms. Thus, improvements in computing hardware, software, network services, and storage have bolstered growth of Internet-based messaging applications, such as social networking platform-based messenger applications (or web-based chat data communications), especially in technological areas aimed at exchanging digital information concerning products and services expeditiously. As an example, various organizations and corporations (e.g., retailer sellers) may exchange information through any number of electronic messaging networks, including social media networks (e.g., Twitter®, Facebook Messenger™, Reddit™, etc.), as well as any user-generated communication (e.g., texting via SMS, or the like, or audio-based telephone calls, and the like). Such organizations and corporations aim generally to provide data and targeted content timely to users online to manage, for example, brand loyalty and reputation, and to enhance customer engagement.

Conventionally, some typically electronic messaging platforms are designed to implement "bot" or "chat bot" applications to provide computer-generated responses to on-line inquiries. However, traditional approaches are not well-suited to multiplex across different data protocols, different communication paths, different computing platforms, and the like. Hence, such applications generally are limited to communicate with a specific communication channel. Also, traditional approaches to providing computer-generated responses to on-line inquiries may also implement a "bot" or "chat bot" application and its functionality limited to a specific language. Consequently, traditional server architectures and processes that provide electronic messaging platforms may include redundancies that suboptimally may require redundant resources to create, implement, and deploy, among other things.

Thus, what is needed is a solution to overcome the deficiencies of the above-described approaches to generate automated responses predictively computing system, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1:
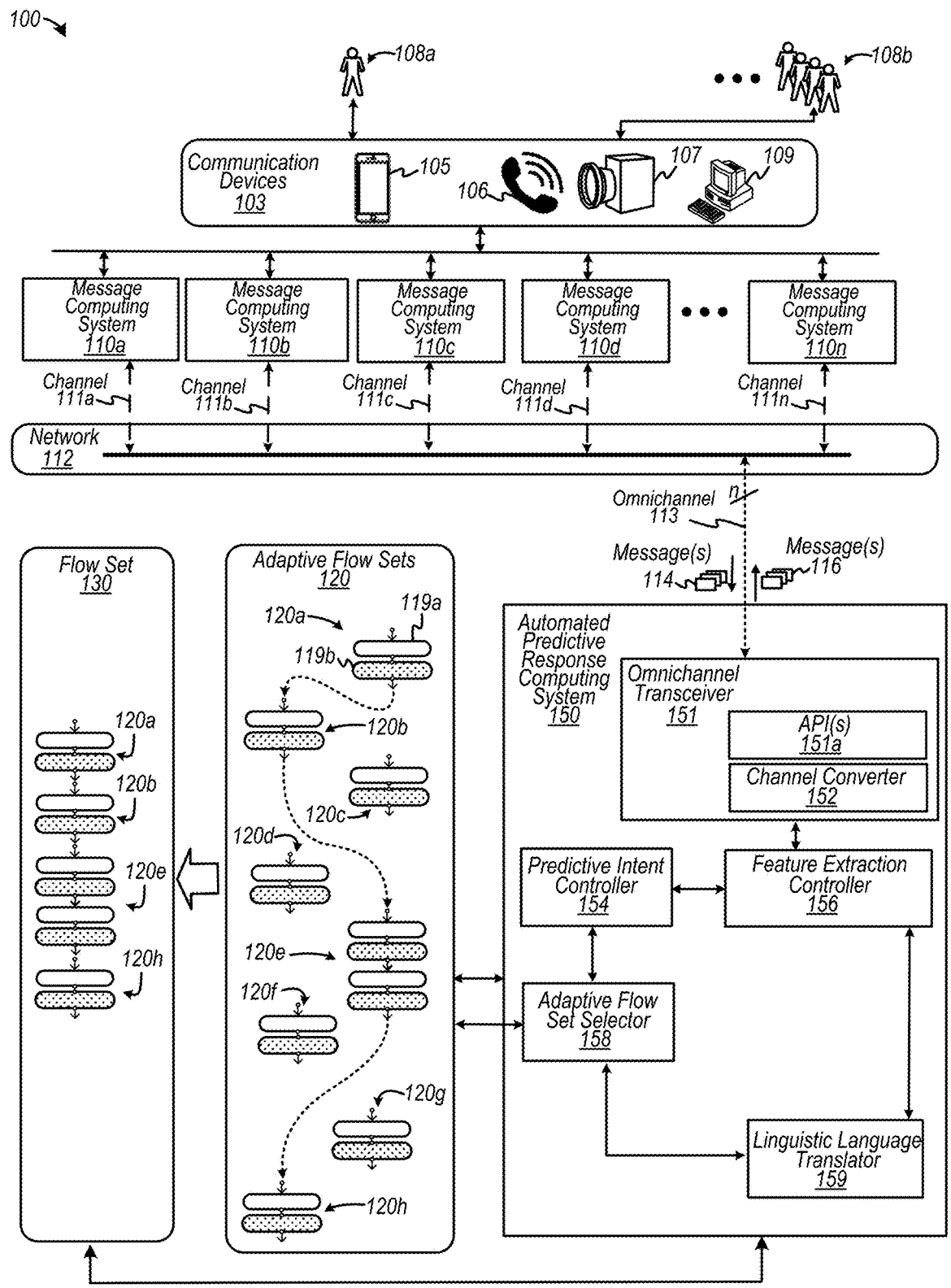
FIG. 1 is a diagram depicting an automated predictive response computing system configured to automatically update or modify a subset of adaptive flow set data responsive to data in electronic messages, according to some embodiments.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in any arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture implementing hardware or software, or both, using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to, a computer program, software, program, firmware, or any other term that may be used to describe, reference, or refer to a logical set of instructions that, when executed, performs a function or set of functions in association with a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures or memory configured to store data in various computer programming languages and formats in accordance with various types of structured and unstructured database schemas such as SQL, MySQL, NoSQL, DynamoDB™, etc. Also applicable are computer programming languages and formats similar or equivalent to those developed by data facility and computing providers such as Amazon® Web Services, Inc. of Seattle, Washington, FMP, Oracle®, Salesforce.com, Inc., or others, without limitation or restriction to any particular instance or implementation. DynamoDB™, Amazon Elasticsearch Service, Amazon Kinesis Data Streams ("KDS")™, Amazon Kinesis Data Analytics, and the like, are examples of suitable technologies provide by Amazon Web Services ("AWS"). Another example of cloud computing services include the Google® cloud platform that may implement a publisher-subscriber messaging service (e.g., Google® pub/sub architecture).

Further, references to databases, data structures, memory, or any type of data storage facility may include any embodiment as a local, remote, distributed, networked, cloud-based, or combined implementation thereof. For example, social networks and social media (e.g., "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering (e.g., user-generated content, such as deployed on YouTube®), content sharing, or like purposes. Data may be generated in various formats such as text, audio, video (including three dimensional, augmented reality ("AR"), and virtual reality ("VR")), or others, without limitation, as electronic messages for use on social networks, social media, and social applications (e.g., "social media") such as Twitter® of San Francisco, California, Snapchat® as developed by Snap® of Venice, California, Messenger as developed by Facebook®, WhatsApp®, or Instagram® of Menlo Park, California, Pinterest® of San Francisco, California, LinkedIn® of Mountain View, California, and others, without limitation or restriction. In various embodiments, the term "content" may refer to, for example, one or more of executable instructions (e.g., of an application, a program, or any other code compatible with a programming language), textual data, image data, video data, audio data, or any other data.

In some examples, data may be formatted and transmitted via electronic messaging channels (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("IM"), File Transfer Protocol ("FTP"), or others, without limitation. As described herein, disclosed processes implemented as software may be programmed using Java®, JavaScript®, Scala, Python™, XML, HTML, and other data formats and programs, without limitation. Disclosed processes herein may also implement software such as Streaming SQL applications, browser applications (e.g., Firefox™) and/or web applications, among others. In some example, a browser application may implement a JavaScript framework, such as Ember.js, Meteor.js, ExtJS, AngularJS, and the like. References to various layers of an application architecture (e.g., application layer or data layer) may refer to a stacked layer application architecture such as the Open Systems Interconnect ("OSI") model or others. As described herein, a distributed data file may include executable instructions as described above (e.g., JavaScript® or the like) or any data constituting content (e.g., text data, video data, audio data, etc.), or both.

In some examples, systems, software, platforms, and computing clouds, or any combination thereof, may be implemented to facilitate online distribution of subsets of units of content, postings, electronic messages, and the like. In some cases, units of content, electronic postings, electronic messages, and the like may originate at social networks, social media, and social applications, or any other source of content.

FIG. 1 is a diagram depicting an automated predictive response computing system configured to automatically update or modify a subset of adaptive flow set data responsive to data in electronic messages, according to some embodiments. Diagram 100 depicts an example of an automated predictive response computing system 150 configured to predictively identify data representing a response as a function of data in an electronic message independent of an electronic communication channel and its functionalities, and independent of data representing a linguistic language, for example, in an electronic message requesting an action or information that may originate from any of users 108a and 108b. For example, any of users 108a and 108b may transmit requests in any data medium, such as text, audio, imagery, and the like, whereby such requests may include data representing requests for information, requests to purchase a product or service, requests for customer service or troubleshooting information, and the like. Automated predictive response computing system 150 may be configured to identify a nature of an electronic message (e.g., a request regarding a certain topic or intent), and further configured to provide automated responses to any of users 108a and 108b.

In various examples, any of users 108a or 108b may generate and transmit a request for information or for an action to be performed in association with automated predictive response computing system 150. Responsive to such requests, automated predictive response computing system 150 may be configured to identify subject matter of a message 114, such as an "intent" or an "entity attribute" of an electronic message, to select one or more adaptive flow sets 120 to provide a flow set 130, which, in turn, as depicted in diagram 100, may represent a conversational flow during which various successive or multiple user inquiries may be automatically received as electronic messages 114. In response to messages 114, automated predictive response computing system 150 may be configured to provide automated responses as electronic messages 116.

As shown in diagram 100, any of users 108a and 108b may communicate electronically via any of message computing systems 110a to 110n using any of communication devices 103. As an example, communication devices 103 may include a mobile computing device 105, a voice-based communication phone 106, an image generation device 107, such as a camera, a computing device 109, or any other electronic device configured to generate requests for information, actions, or any other outcome.

In various examples, message computing systems 110a to 110n may be configured to implement social networks, social media, and social applications (e.g., "social media") such as Twitter® of San Francisco, California, Reddit® of San Francisco, California, Snapchat® as developed by Snap® of Venice, California, Messenger services as developed by Facebook®, WhatsApp®, or Instagram® of Menlo Park, California, Pinterest® of San Francisco, California, LinkedIn® of Mountain View, California, Telegram Messenger™ of Telegram Messenger Inc. of the United Kingdom, Slack™ of Slack Technologies, Inc., and others, without limitation or restriction. Message computing systems 110a to 110n may be configured to generate and host any other type of digital content, such as email, text messaging (e.g., via SMS messaging, Multimedia Messaging Service ("MMS"), WhatsApp™, WeChat™, Apple® Business Chat™, Instagram™ Direct Messenger, etc.), Twilio® SMS, and web pages configured to implement web chat functionality (e.g., news websites, retailer websites, etc.). Further, message computing systems 110a to 110n may be configured to provide image data and/or audio data, such as voice data to facilitate telephone calls. As an example, message computing systems 110a to 110n may be configured to implement Twilio Voice® or any other voice or telephony application.

Any of message computing systems 110a to 110n may implement various corresponding electronic communication channels 111a to 111n to exchange data via one or more networks 112, such as the Internet or any other network. Each of electronic communication channels 111a to 111n may be configured to exchange data using different (e.g., proprietary) protocols, data formats, metadata (and types thereof), etc. As shown, automated predictive response computing system 150 may be configured to receive electronic messages 114 via omnichannel electronic communication channel 113, whereby any of messages 114 may originate any of the different electronic communication channels 111a to 111n.

In the example shown, automated predictive response computing system 150 may be configured to include an omnichannel transceiver 151, a feature extraction controller 156, a predictive intent controller 154, an adaptive flow set selector 158, and a linguistic language translator 159. Omnichannel transceiver 151 may be configured to receive electronic messages 114 from any disparate electronic communication channels 111a to 111n and data formats to convert data representing electronic messages 114 into data formats with which automated predictive response computing system 150 may analyze and generate automated responses thereto. Hence, omnichannel transceiver 151 may be configured to detect data representing one or more electronic messages 114 configured to generate a response associated with an electronic communication channel of any electronic communication channels 111a to 111n, any of which may be associated with multiple data sources (e.g., computing platforms including processors and memory configured to provide communicative functionalities).

Omnichannel transceiver 151 may be configured to include logic to implement any number of application programming interface ("APIs") 151a and a channel converter 152. In some examples, which are non-limiting, omnichannel transceiver 151 may be configured to implement one or more APIs to exchange data with any of electronic communication channels 111a to 111n. As an example, APIs 151a may include an API configured to communicate electronically with Facebook® Messenger and the like. Channel converter 152 may be configured to detect a data format in which data of electronic message 114 is being conveyed, and may be further configured to convert the detected data format into a uniform or agnostic data format, such as a text data format. As an example, image recognition software may be configured to detect an image and characterize its data elements, including an "intent" and associated "entity attributes." As another example, channel converter 152 may be configured to detect and identify (e.g., via tagged data) that data associated with electronic message 114 include text-based data, including supplemental data (e.g., metadata) as available. Further, omnichannel transceiver 151 may be configured to transmit messages 116 that conform with requirements of any of electronic communication channels 111a to 111n.

Feature extraction controller 156 may be configured to extract features from one or more portions of data of one or more electronic messages 114. In some examples, feature extraction controller 156 may be configured to identify and form data units, such as tokens, words, linguistic phrases, etc., using any predictive algorithm, including any machine learning algorithm, deep learning algorithm, and other natural language algorithmic function (e.g., natural language processing, or "NLP"). In some examples, feature extraction controller 156 may be configured to generate data so that predictive intent controller 154 may identify from extracted data units an "intent" and one or more "entity attributes" (e.g., parameters) with which to generate an automated response. In some examples, feature extraction controller 156 may be configured to extract feature data that may include units of text (e.g., words or tokens), units of image data (e.g., an amount of pixels, or matched image data), units of audio or voice data, and the like.

Predictive intent controller 154 may be configured to receive data including extracted feature data from feature extraction controller 156 and other data, including, but not limited to, supplemental data, metadata, and other ancillary data. Further, predictive intent controller 154 may be configured to predict (e.g., probabilistically) an "intent" of subject matter associated with data of electronic message 114. In some examples, "intent" associated with data of an electronic message may be referred to as a "trigger," and may be calculated to be a predicted topic of a subset (e.g., a step) of an electronic conversation between any of users 108a and 108b and automated predictive response computing system 150. For example, an electronic message 114 may state "I want to travel now from Paris to Hong Kong. Are there any flights available?" In this example, predictive intent controller 154 may include logic configured to determine a user is interested "TRAVEL" as an "intent." Further, predictive intent controller 154 may be configured to determine entity attributes describing a "time" of travel (e.g., "now"), a destination (e.g., "Hong Kong"), and a point of origination (e.g., "Paris"). As such, predictive intent controller 154 may be configured to identify one or more subsets of intent-related data and one or more subsets of data representing one or more entity attributes (e.g., parameters with which to respond to an intent of electronic message 114). In some examples, predictive intent controller 154 may be configured to predict, identify, and monitor a "context" during which an intent of electronic message 114 may be received and analyzed relative to other messages as part of an exchange of data constituting conversational flow.

Adaptive flow set selector 158 may be configured to receive data representing an intent and entity attributes for each (or multiple) messages 114. Based on data representing an intent and entity attributes, adaptive flow set selector 158 may be configured to select any of adaptive flow sets 120, such as any adaptive flow sets 120a to 120h. Each of adaptive flow sets 120a to 120h may represent a predicted intent and a subset of entity attributes. In the example shown, adaptive flow set 120a may be associated with data representing electronic message data 119a directed to an intent, and may also be associated with data representing electronic message data 119b as a response. Other adaptive flow sets 120b to 120h may include data flows based on an intent of an electronic message 114 and responsive messages 116, any of which may include any number of permutations, such as types of triggers and corresponding predictive response, branching response flows, and the like. Further, adaptive flow set selector 158 may be configured to identify data representing any other subset of intent-related data and data representing one or more other entity attributes to select another adaptive flow set (e.g., adaptive flow sets 120b to 120h) based on, for example, at least other intent-related data.

According to various embodiments, adaptive flow set selector 158 may be configured to identify an adaptive flow set 120a to 120h (e.g., as a constituent component of a flow set 130) in response to identifying data representing intent and one or more entity attributes. As shown, adaptive flow selector 158 may be configured to select adaptive flow sets 120a, 120b, 120e, and 120h responsive to incoming electronic messages 114 and associated intents and entity attributes. As shown, adaptive flow set selector 158 may implement adaptive flow sets 120a, 120b, 120e, and 120h as flow set 130, which may be configured to optimally respond to each inquiry or electronic message 114 from any of users 108a and 108b. As such, adaptive flow selector 158 may be configured to select response or reply data (e.g., reply 119b as message 116).

Linguistic language translator 159 may be configured to receive data from feature extraction controller 156 that indicates a type of linguistic language (e.g., a spoken language) that may be defined by region and/or dialect, in at least some examples. In some examples, linguistic language translator 159 may be configured to determine a language based on text, a verbal utterance, or any other data input. Further, linguistic language translator 159 may be configured to translate or modify languages of received data in messages 114 and responses in messages 116, whereby subsets of messages 114 and 116 may vary in languages. For example, a multilingual speaker as user 108a or 108b may inadvertently vacillate among a number of languages. In this case, linguistic language translator 159 may be configured to detect messages 114 by a specific user 108a in different languages, and may be further configured to correspond in reply messages 116 in corresponding languages. In various examples, linguistic language translator 159 may be configured to adapt any of adaptive flow sets 120a to 120h to any language.

In view of the foregoing, structures and/or functionalities depicted in FIG. 1 as well as other figures herein, may be implemented as software, applications, executable code, application programming interfaces ("APIs"), processors, hardware, firmware, circuitry, or any combination thereof. In at least one example, automated predictive response computing system 150 may be implemented as a chatbot application.

Figure 2:
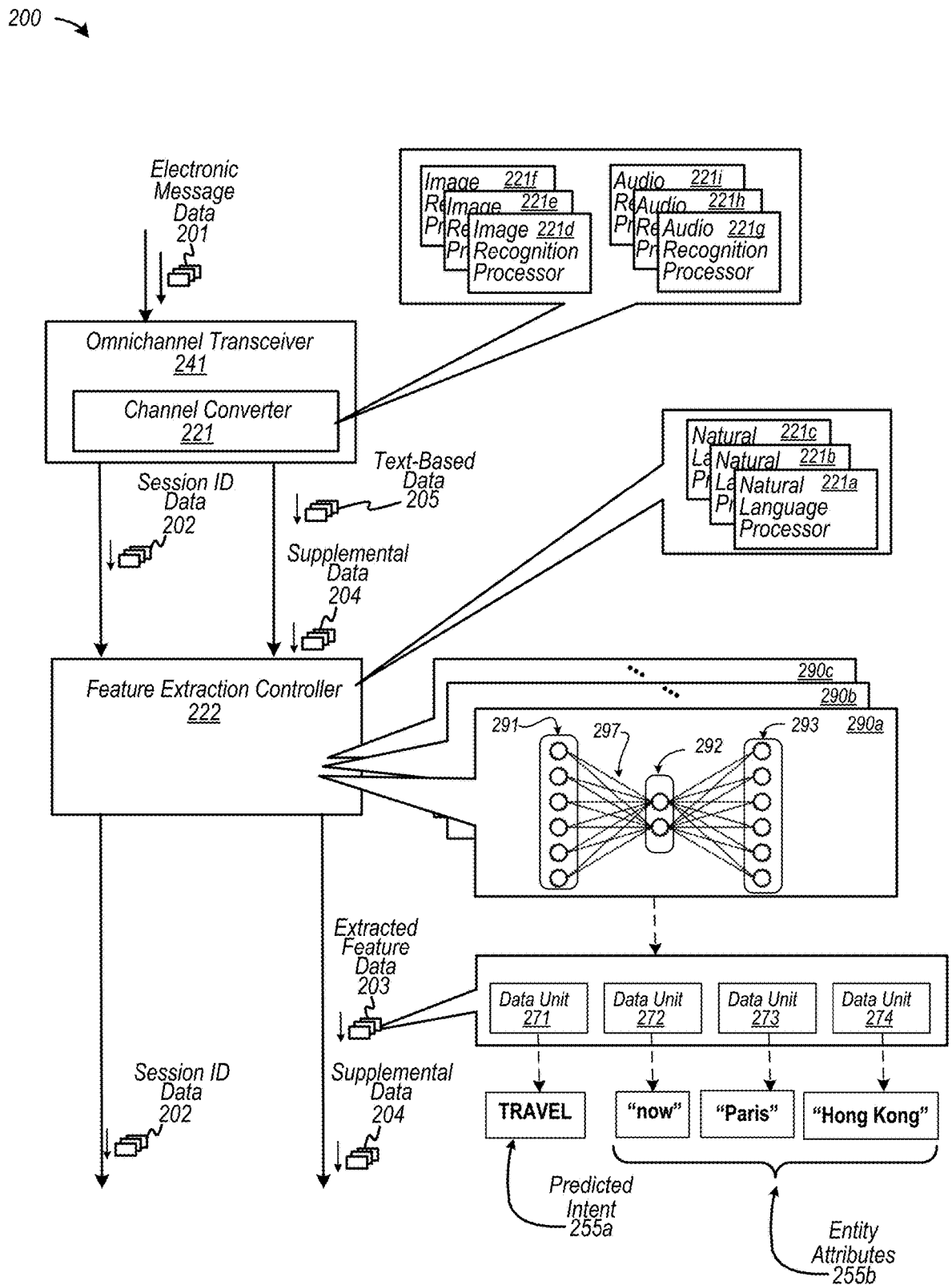
FIG. 2 depicts an example of a subset of functional elements of an automated predictive response computing system, according to some examples.

FIG. 2 depicts an example of a subset of functional elements of an automated predictive response computing system, according to some examples. Diagram 200 includes an omnichannel transceiver 241, which is shown to include a channel converter 221, and a feature extraction controller 222. Note that elements depicted in diagram 200 of FIG. 2 may include structures and/or functions as similarly-named or similarly-numbered elements depicted in other drawings.

In some examples, omnichannel transceiver 241 may be configured to receive electronic message data 201 from any electronic communication channel, and may further configured to generate or transmit session identifier ("ID") data 202, text-based data 205, and supplemental data 204. Session ID data 202, which may be optional, may include data referring to an originating communication device 103 of FIG. 1 (e.g., an IP or MAC address, etc.) or any other identifying information associated with a particular user 108a. Session ID data 202 may be used to monitor exchanges of data constituting conversation data for establishing a "context" with which to enhance accuracy of generating automated responses to electronic message data 201. In some examples, omnichannel transceiver 241 may be configured to identify and transmit supplemental data 204, which may include any metadata that be identified (e.g., in association with a particular electronic communication channel). For example, supplemental data 204 may include metadata specifying a particular language (and/or geographic region) that a particular user desires to communicate linguistically.

Channel converter 221 and feature extraction controller 222 may include any number of feature extraction processes to, for example, extract feature data to analyze electron message data 201 and supplemental data. Channel converter 221 and feature extraction controller 222 may be further configured to generate a number of feature vectors to perform pattern recognition, predictive or probabilistic data analysis, machine learning, deep learning, or any other algorithm (e.g., heuristic-based algorithms) to identify at least a subset of features that may constitute an event (as derived from data from various data sources).

Channel converter 221 may include any number of image recognition processor algorithms 221d to 221f, any number of audio recognition processor algorithms 221g to 221i, or any other set of algorithms. Image recognition processor algorithms 221d to 221f may be configured to perform character recognition, facial recognition, or implement any computer vision-related operation to determine image-related features, which may be interpreted into text-based data 205. Audio recognition processor algorithms 221g to 221i may be configured to perform voice and speech recognition, sound recognition, or implement any audio-related operation to determine audio-related features, which may be converted into text-based data 205.

Feature extraction controller 222 may include any number of natural language processor algorithms 221a to 221c that may be configured, for example, to tokenize sentences and words, perform word stemming, filter out stop or irrelevant words, or implement any other natural language processing operation to determine text-related features. In some examples, feature extraction controller 222 may include any number of predictive data modeling algorithms 290a to 290c that may be configured to perform pattern recognition and probabilistic data computations. For example, predictive data modeling algorithms 290a to 290c may apply "k-means clustering," or any other clustering data identification techniques to form clustered sets of data that may be analyzed to determine or learn optimal classifications of "intent" data and associated outputs and supplemental data related thereto, as well as "entity attribute" data. In some examples, feature extraction controller 222 maybe configured to detect patterns or classifications among datasets through the use of Bayesian networks, clustering analysis, as well as other known machine learning techniques or deep-learning techniques (e.g., including any known artificial intelligence techniques, or any of k-NN algorithms, linear support vector machine ("SVM") algorithm, regression and variants thereof (e.g., linear regression, non-linear regression, etc.), Bayesian inferences and the like, including classification algorithms, such as Naïve Bayes classifiers, or any other statistical, empirical, or heuristic technique). In other examples, predictive data modeling algorithms 290a to 290c may include any algorithm configured to extract features and/or attributes based on classifying data or identifying patterns of data, as well as any other process to characterize subsets of data.

In the example shown, feature extraction controller 222 may be configured to implement any number of statistical analytic programs, machine-learning applications, deep-learning applications, and the like. Feature extraction controller 222 is shown to have access to any number of predictive models, such as predictive model 290a, 290b, and 290c, among others. As shown, predictive data model 290a may be configured to implement one of any type of neuronal networks to predict an action or disposition of an electronic message, or any output representing an extracted feature for determining either an event or supplemental data to determine compatibility, or both. A neural network model 290a includes a set of inputs 291 and any number of "hidden" or intermediate computational nodes 292, whereby one or more weights 297 may be implemented and adjusted (e.g., in response to training). Also shown is a set of predicted outputs 293, such as text terms defining a predicted "intent" 255a or "entity attributes" 255b (e.g., parameters), among any other types of outputs.

Feature extraction controller 222 may include a neural network data model configured to predict (e.g., extract) contextual or related text terms based on generation of vectors (e.g., word vectors) with which to determine degrees of similarity (e.g., magnitudes of cosine similarity) to, for example, establish "contextual" compatibility, at least in some examples. Output data 293 as contextual or related text terms may be used to identify intent data (e.g., as an event or a trigger). In at least one example, feature extraction controller 222 may be configured to implement a "word2vec" natural language processing algorithm or any other natural language process that may or may not transform, for example, text data into numerical data (e.g., data representing a vector space). According to various other examples, feature extraction controller 222 may be configured to implement any natural language processing algorithm.

In view of the foregoing, channel converter 221 and feature extraction controller 222 may be configured to implement various feature extraction functions to extract features that can identify one or more groups of data units 271 to 274 as extracted feature data 203, whereby each group of data units 271 to 274 may be associated with an electronic message data 201. As an example, electronic message data 201 may include text data requesting "I need to book a flight now from Paris to Amsterdam." Further to this example, data unit 271 may represent extracted text term "TRAVEL" as a predicted "intent" data value 255a. Data unit 272 may represent extracted text term "now" as an entity attribute (or parameter) that describes timing of a "traveling" event. Data unit 273 may represent extracted text term "Paris," which may describe a point of embarkation and data unit 274 may represent extracted text term "Hong Kong" as a destination. Data units 272, 273, and 274 may be entity attributes (or parameters) 255b. Note further that extracted text term "TRAVEL" may be determined as a predicted "intent" data value 255a by feature extraction controller 222 or by predictive intent controller 354 of FIG. 3, or by both.

Figure 3:
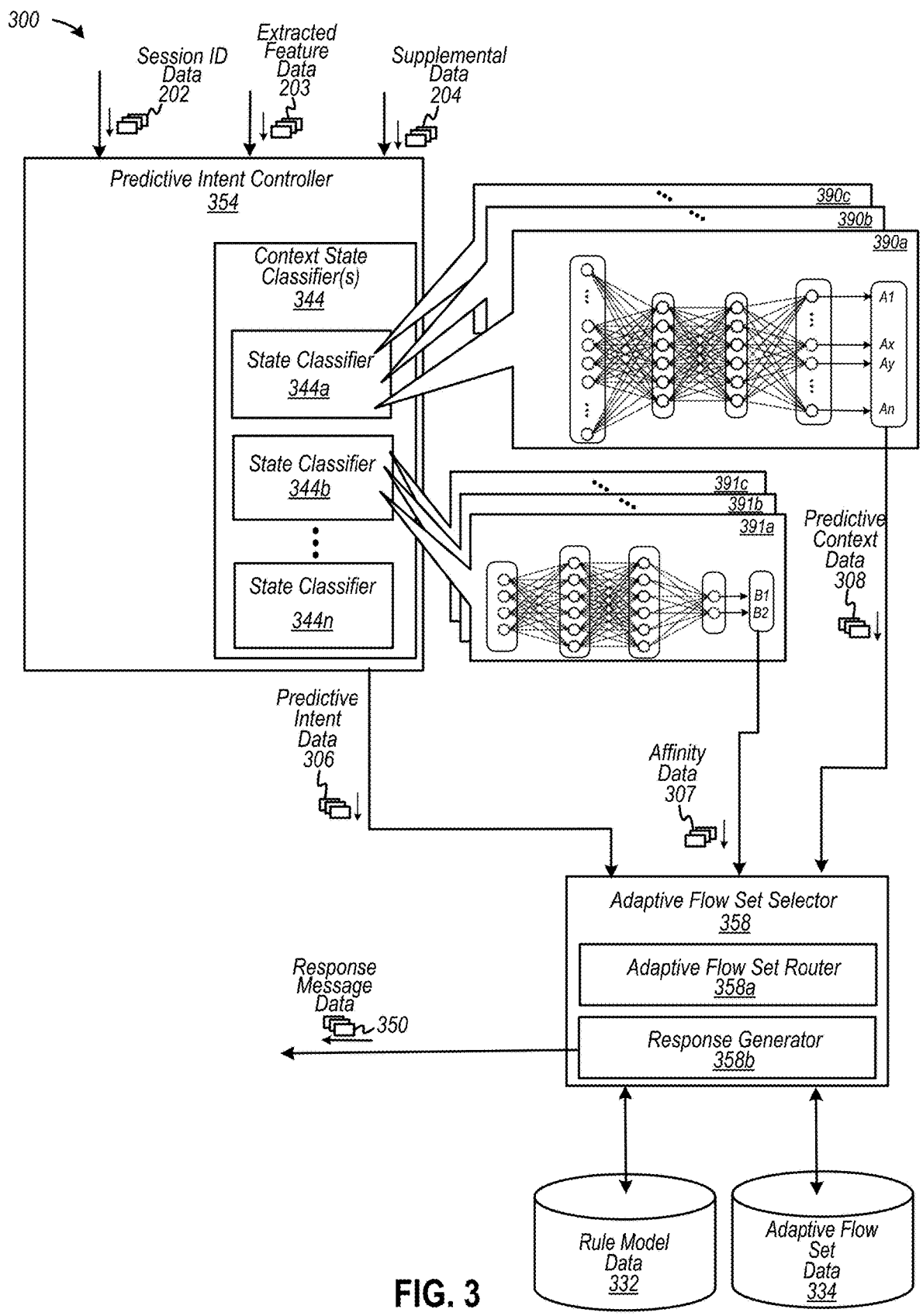
FIG. 3 depicts an example of another subset of functional elements of an automated predictive response computing system, according to some examples

FIG. 3 depicts an example of another subset of functional elements of an automated predictive response computing system, according to some examples. Diagram 300 includes a predictive intent controller 354, which is shown to include a one or more context state classifiers 344, and an adaptive flow set selector 358. Predictive intent controller 354 may be configured to receive one or more of session ID data 202, extracted feature data 203, and supplemental data 204 of FIG. 2. In some examples, predictive intent controller 354 may be configured to determine (or confirm) that one or more extracted data units (e.g., one or more extracted text terms) specify a topic of electronic conversation, or an intent of an electronic message. Predictive intent controller 354 may generate predictive intent data 306 specifying an "intent" of an electronic message. Note that elements depicted in diagram 300 of FIG. 3 may include structures and/or functions as similarly-named or similarly-numbered elements depicted in other drawings.

In some examples, state classifiers 344a and 344b may be configured to implement any number of statistical analytic programs, machine-learning applications, deep-learning applications, and the like. State classifier 344a may include any number of predictive models, such as predictive models 390a, 390b, and 390c, and state classifier 344b may include one or more predictive models, such as predictive models 391a, 391b, and 391c. Predictive models 390 and 391 may be implemented similar to, or equivalent to, predictive models described in FIG. 2.

In one example, state classifier 344a may receive inputs of any combination of session ID data 202, extracted feature data 203, and supplemental data 204 to compute predictive context data 308. For example, inputs to state classifier 344a may generate predictive context data 308 to indicate a predicted state of a flow of conversational data to provide context to determine an optimal reply or response. As another example, inputs into state classifier 344b may determine affinity data 307 that may indicate sentiment state data, such as whether a distributed data file may be associated with a positive affinity state, a neutral affinity state, or a negative affinity state. In accordance with at least some examples, affinity data 307 (e.g., sentiment state data or other like data) may include a range of data values that can include data values ranging from a maximal value of a positive affinity state to a maximal negative affinity state, the range including at least a subset of one or more data values representing a neutral affinity state. Thus, affinity data 307 may include a range of affinity (e.g., sentiment values). Other state classifiers, such as state classifier 344n, may generate other electronic message state data characterizing an electronic message to determine an adaptive flow set with which to respond.

Adaptive flow set selector 358 may be configured to receive predictive intent data 306 and other data from predictive intent controller 354. In the example shown, adaptive flow set selector 358 may include an adaptive flow set router 358a and a response generator 358b. Further, adaptive flow set selector 358 may be configured to analyze data representing an "intent" (e.g., a predicted topic or intended result of an electronic message), one or more entity attributes, context data, etc., to calculate an optimal response associated with an adaptive flow set. Adaptive flow set selector 358 may be coupled electronically to a rule model data repository 332 and an adaptive flow set data repository 334. In some examples, data representing rule model data 332 may be configured to provide one or more rules with which to route from one adaptive flow set to another data flow set to adaptively and flexibly provide replies and responses to corresponding incoming electronic messages. Adaptive flow set data repository 334, according to some examples, may be configured to include groupings of any number of adaptive flow sets that may be invoked as a function of one or more of a detected intent, a context, and a type of reply (e.g., a response message, an action to be performed, a "hand-off" to an agent, a deflected voice call to text message, and the like).

Adaptive flow set router 358a may be configured to control a flow of an electronic conversation by, for example, identifying successive "intents" associated with successive incoming electronic messages, and by routing the flow of the electronic conversation based on predicted intents and responses. As such, adaptive flow set router 358a may be configured to route selection of adaptive flow sets, such as depicted in FIG. 1. Response generator 358b may be configured to generate response message data 350 based on a selected adaptive flow set. Response message data 350 may include one or more of a response message, an action to be performed, a "hand-off" to an agent, a deflected voice call to text message, among other actions.

In view of the foregoing, structures and/or functionalities depicted in FIGS. 2 and 3 as well as other figures herein, may be implemented as software, applications, executable code, application programming interfaces ("APIs"), processors, hardware, firmware, circuitry, or any combination thereof.

Figure 4:
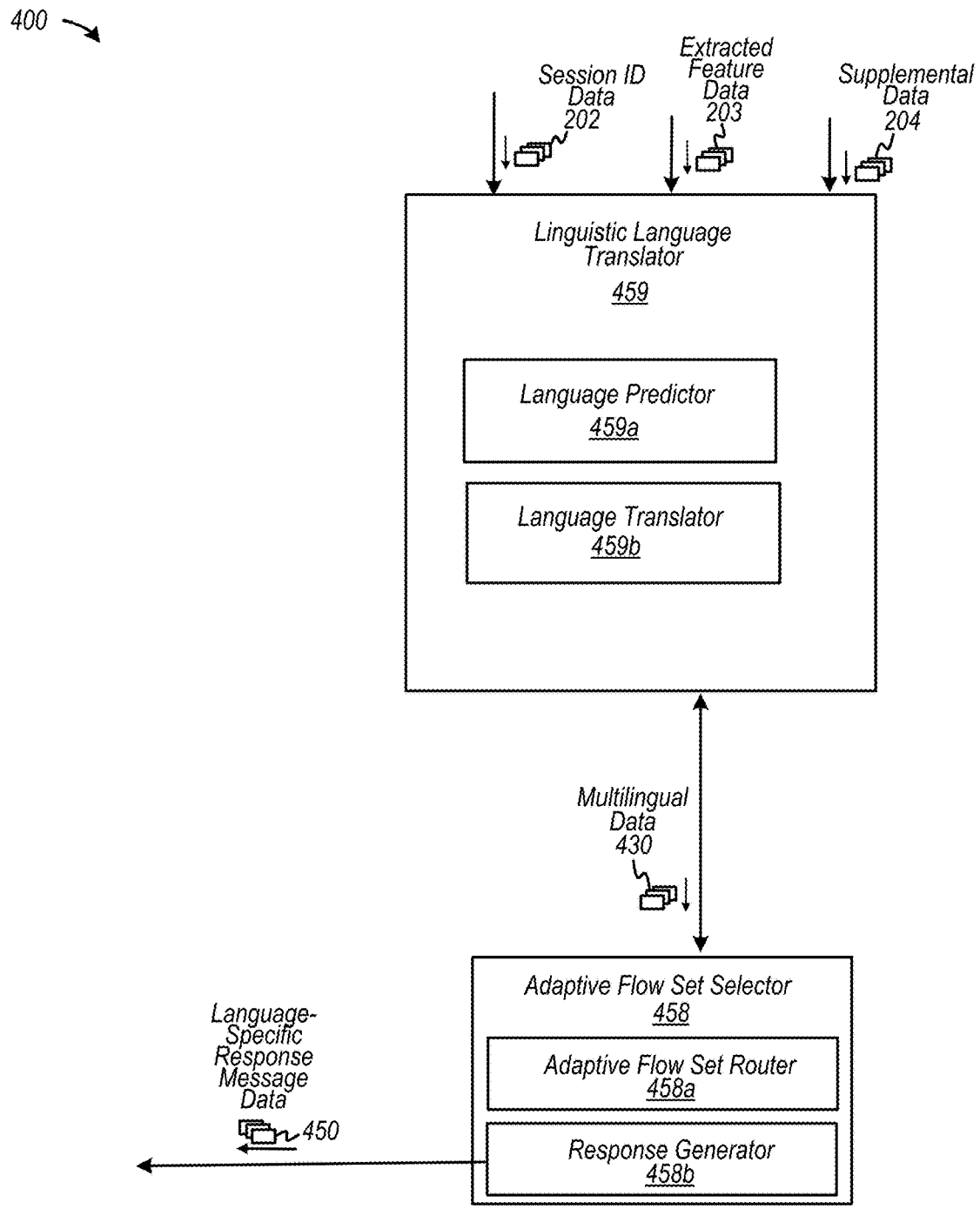
FIG. 4 depicts an example of yet another subset of functional elements of an automated predictive response computing system, according to some examples.

FIG. 4 depicts an example of yet another subset of functional elements of an automated predictive response computing system, according to some examples. Diagram 400 includes a linguistic language translator 459, which is shown to include logic implementing a language predictor 459a and a language translator 459b. Also, linguistic language translator 459 may be coupled electronically to the adaptive flow set selector 458. Linguistic language translator 459 may be configured to receive one or more of session ID data 202, extracted feature data 203, and supplemental data 204 of FIG. 2. Note that elements depicted in diagram 400 of FIG. 4 may include structures and/or functions as similarly-named or similarly-numbered elements depicted in other drawings.

In one example, linguistic language translator 459 may be configured to receive supplemental data 204 that indicates a type of linguistic language (e.g., a spoken language) that may be defined by region and/or dialect, in at least some examples. In some examples, language predictor 459a may be configured to determine a language based on text in an electronic message, data representing a language as metadata, a verbal utterance in a voice-based telephone call, an output of a natural language processor ("NLP"), or any other data input. Further, language translator 459b may be configured to translate or modify languages of received data in electronic messages and transmitted responses. As such, linguistic language translator 459 may be configured to generate multilingual data 430 that includes data representing one or more languages with which to reply to a user.

Adaptive flow set selector 458 is shown to include an adaptive flow set router 458a and a response generator 458b. Based on data representing one or more languages as indicated in multilingual data 430, adaptive flow set router 458a may be configured to select an adaptive flow set consistent within an identified language. Further, response generator 458b may be configured to generate language-specific response message data 450 to guide a conversational flow of user messages and automated responses, regardless of whether a user (e.g., a multilingual user) switches among languages in electronic messages during a conversational flow.

In view of the foregoing, structures and/or functionalities depicted in FIG. 4, as well as other figures herein, may be implemented as software, applications, executable code, application programming interfaces ("APIs"), processors, hardware, firmware, circuitry, or any combination thereof.

Figure 5:
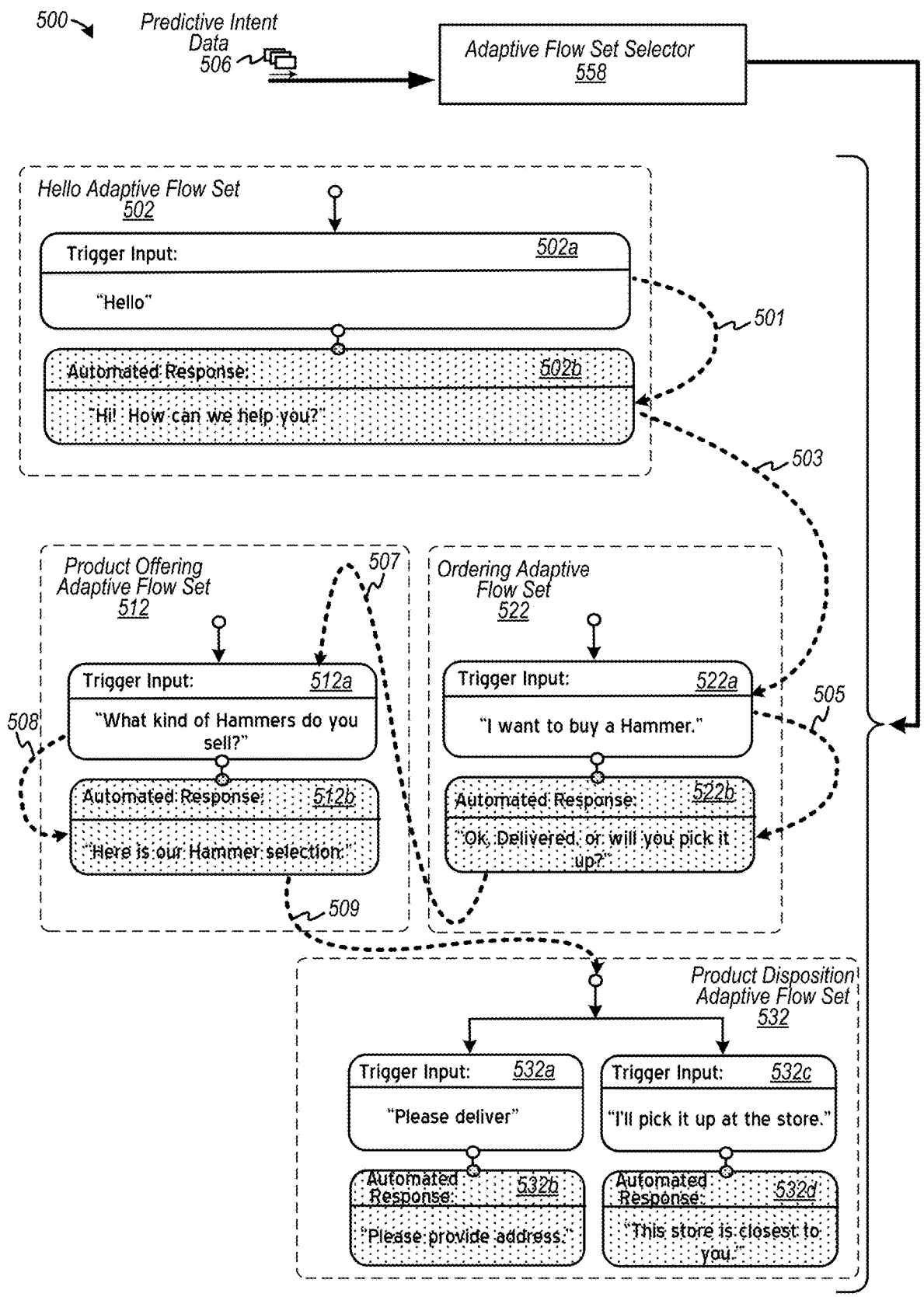
FIG. 5 is a diagram depicting an example of an adaptive flow set selector configured to multiplex among any number of adaptive flow sets, according to some examples.

FIG. 5 is a diagram depicting an example of an adaptive flow set selector configured to multiplex among any number of adaptive flow sets, according to some examples. Diagram 500 depicts an adaptive flow set selector 558 being configured to route a conversational flow as a flow set among any number of adaptive flow sets, responsive to predictive intent data 506 that may include data representing communication of an "intent." Note that elements depicted in diagram 500 of FIG. 5 may include structures and/or functions as similarly-named or similarly-numbered elements depicted in other drawings.

Diagram 500 depicts any number of adaptive flow sets, such as adaptive flow set 502, adaptive flow set 512, adaptive flow set 522, and adaptive flow set 532. Adaptive flow set 502 is a "hello" adaptive flow set configured to provide introductory interface data with a user. For example, a user may transmit an electronic message "Hello," which may be classified as a trigger input 502a. In response, an automated response 502b may be transmitted as a message "Hi! How can we help you?"

An adaptive flow set 512 may be configured as a product offering adaptive flow set 512 that may be configured to detect a user's interest in learning more about a particular product offering, such as types of hammers, and may provide a corresponding automated response. In the example shown, product offering adaptive flow set 512 is configured to match with an intent equivalent to "what kind of hammers do you sell?" As an automated response 512b, product offering adaptive flow set 512 may be configured to provide information (e.g., imagery or a link to types of hammers) with the indication "here is our hammer selection."

An adaptive flow set 522 may be implemented as an ordering adaptive flow set 522 that may be configured to detect a user's interest to order a product, such as a hammer, and may be configured further to generate a corresponding automated response. In the example shown, ordering adaptive flow set 522 may be configured to match with an intent equivalent to "I want to buy a hammer." As an automated response 522b, ordering adaptive flow set 522 may be configured to provide options of procurement with indications: "OK. Delivered, or will you pick it up [at our local store]."

An adaptive flow set 532 may be implemented as a product disposition adaptive flow set 532 that may be configured to detect a user's interest whether a user wishes to have a product, such as a hammer, delivered or prepared for pick-up. As shown, product disposition adaptive flow set 532 includes a branching of flows based on whether a user may wish to have a product delivered or picked up. Adaptive flow set 532 includes a trigger at 532a based on whether a user indicates a preference for delivery (e.g., "please deliver"). In response, automated response 532b may be configured to generate a response requesting to "please provide [an] address." By contrast, adaptive flow set 532 may also include a trigger at 532c configured to detect whether a user indicates a preference for picking up a product at a store location. As shown, a user may have an option to indicate at trigger input 532c "I'll pick it up at the store," whereby automated response 532d may be configured to instruct the user that there is a store "closest to you."

In view of the foregoing, adaptive flow set selector 558 may be configured to select any adaptive flow set responsive to any intent derived from successive user requests. In the example shown, adaptive flow set selector 558 may be configured to select subsets of flows among adaptive flow sets 502, 512, 522, and 532. Diagram 500 depicts adaptive flow set selector 558 configured to select responses based on intents derived from successive user-initiated electronic messages, whereby the responses may be provided responsive to flows 501, 503, 505, 507, 508, and 509.

Figure 6:
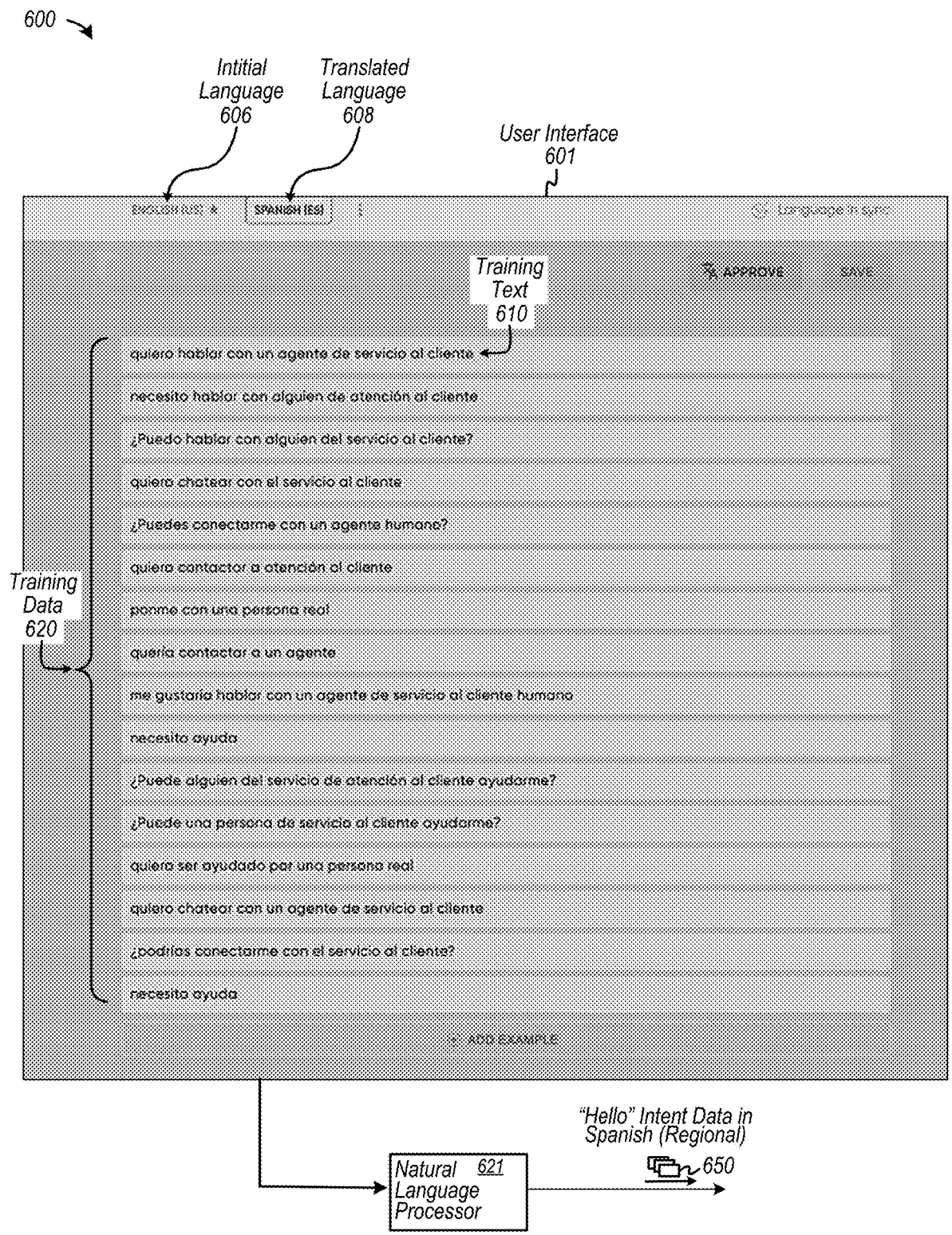
FIG. 6 is a diagram depicting an example of a user interface configured to train one or more natural language processors to facilitate prediction of an intent of an electronic message, according to some examples.

FIG. 6 is a diagram depicting an example of a user interface configured to train one or more natural language processors to facilitate prediction of an intent of an electronic message, according to some examples. Diagram 600 depicts a user interface 601 with which a user or an automated predictive engine (e.g., based on machine learning or deep learning algorithms) may be configured to provide training data 620 of the set of training text 610. In this example, the initial language 606 is English (e.g., regionally in the US) and the training data 620 may be configured in translating language 608 as Spanish (e.g., regionally in Spain). Based on training data 620, natural language processor 621 may be configured to detect a "Hello" trigger or event with which to provide intent data 650.

Figure 7:
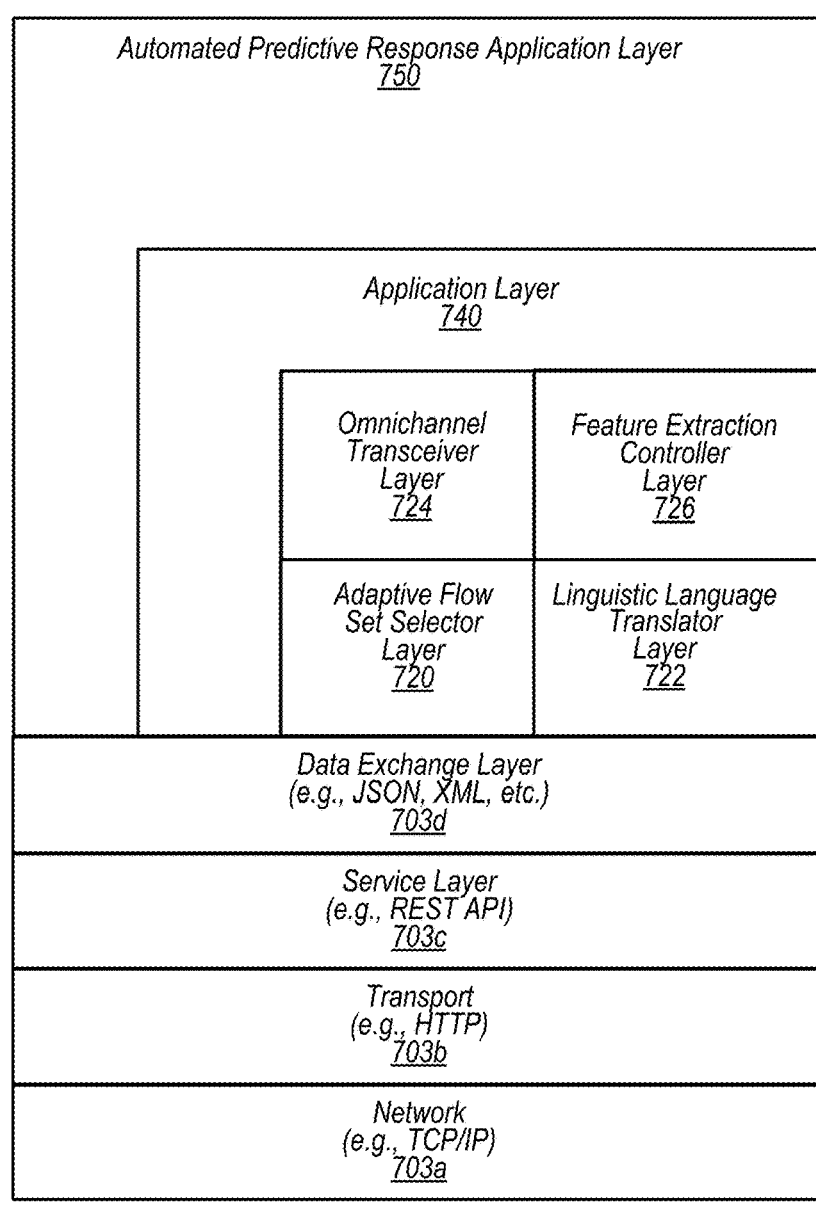
FIG. 7 illustrates an exemplary layered architecture for implementing an automated predictive response application, according to some examples.

FIG. 7 illustrates an exemplary layered architecture for implementing an automated predictive response application, according to some examples. Diagram 700 depicts application stack ("stack") 701, which is neither a comprehensive nor a fully inclusive layered architecture for detecting intent and entity attributes in electronic messages, and in response, automatically generating one or more compatible electronic messages as one or more responses or actions. One or more elements depicted in diagram 700 of FIG. 7 may include structures and/or functions as similarly-named or similarly-numbered elements depicted in other drawings, or as otherwise described herein, in accordance with one or more examples, such as described relative to FIGS. 1-6 or any other figure or description herein.

Application stack 701 may include an automated predictive response application layer 750 upon application layer 740, which, in turn, may be disposed upon any number of lower layers (e.g., layers 703a to 703d). Automated predictive response application layer 750 may be configured to provide functionality and/or structure to implement an automated predictive response application and/or system, as described herein. Further, automated predictive response application 750 and application layer 740 may be disposed on data exchange layer 703d, which may implemented using any programming language, such as HTML, JSON, XML, etc., or any other format to effect generation and communication of requests and responses among computing devices and computational resources constituting an enterprise or an entity and a planning application and/or platform configured to disseminate information expeditiously, such as information regarding products or services aligned with data in targeted data sources compatible with data integration. Data exchange layer 703d may be disposed on a service layer 703c, which may provide a transfer protocol or architecture for exchanging data among networked applications. For example, service layer 703c may provide for a RESTful-compliant architecture and attendant web services to facilitate GET, PUT, POST, DELETE, and other methods or operations. In other examples, service layer 703c may provide, as an example, SOAP web services based on remote procedure calls ("RPCs"), or any other like services or protocols (e.g., APIs). Service layer 703c may be disposed on a transport layer 703b, which may include protocols to provide host-to-host communications for applications via an HTTP or HTTPS protocol, in at least this example. Transport layer 303b may be disposed on a network layer 703a, which, in at least this example, may include TCP/IP protocols and the like.

As shown, automated predictive response application layer 750 may include (or may be layered upon) an application layer 740 that includes logic constituting an omnichannel transceiver layer 724, an adaptive flow set selector layer 720, a feature extraction controller layer 726, and a linguistic language translator layer 722. In various examples, layers 720, 722, 724, and 726 may include logic to implement the various functionalities described herein.

Any of the described layers of FIG. 7 or any other processes described herein in relation to other figures may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including, but not limited to, Python™, ASP, ASP.net, .Net framework, Ruby, Ruby on Rails, C, Objective C, C++, C#, Adobe® Integrated Runtime™ (Adobe® AIR™) ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc., as well as any proprietary application and software provided or developed by Khoros, LLC, Flow.ai B.V., or the like. The above-described techniques may be varied and are not limited to the embodiments, examples or descriptions provided.

Figure 8:
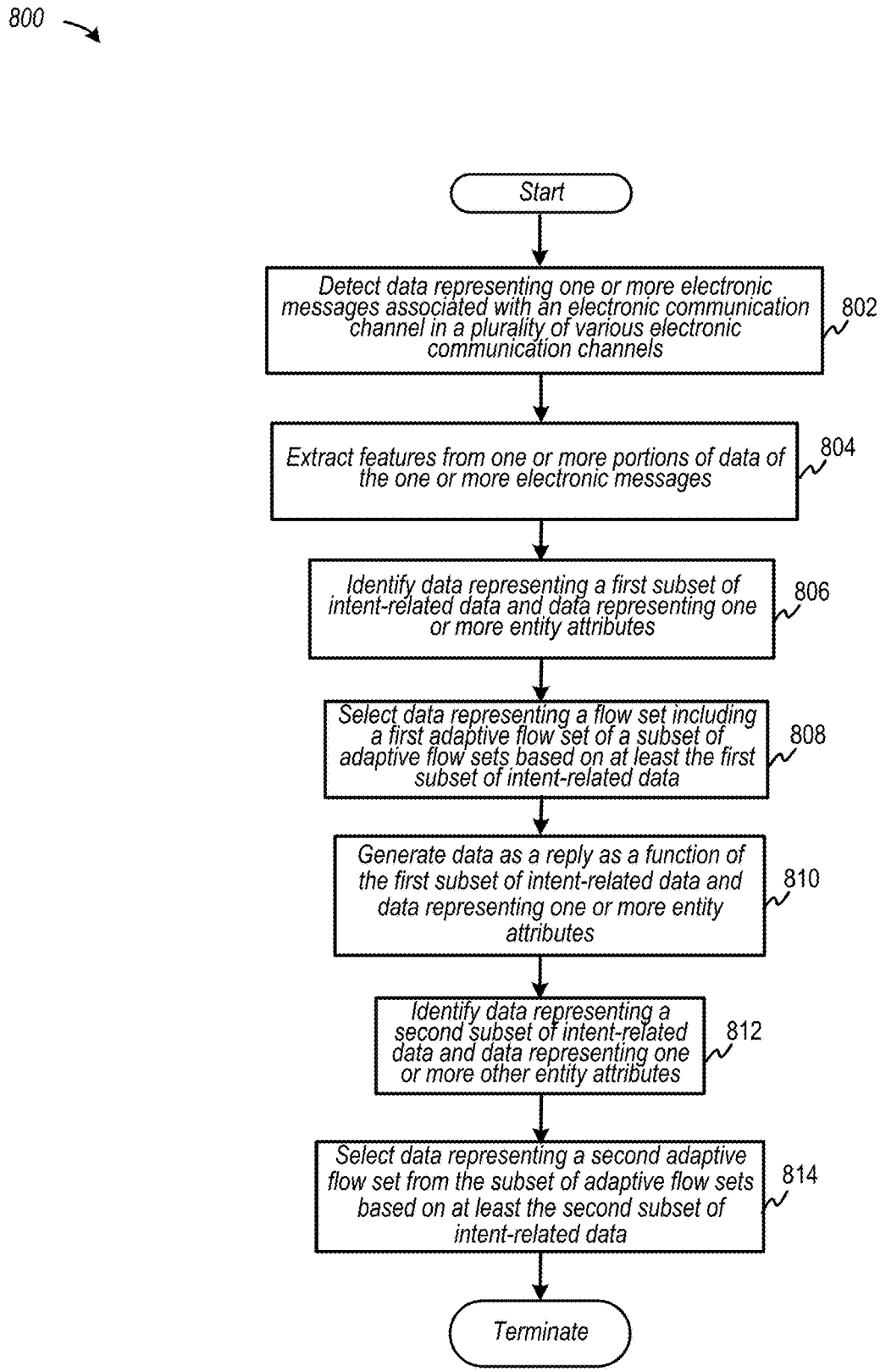
FIG. 8 is a flow diagram as an example of facilitating automated responses to electronic messages originating at various electronic communication channels, according to some embodiments.

FIG. 8 is a flow diagram as an example of facilitating automated responses to electronic messages originating at various electronic communication channels, according to some embodiments. Flow 800 is another example of implementing an automated predictive response application in accordance with various examples described herein. At 802, data representing one or more electronic messages associated with an electronic communication channel associated with multiple data sources may be detected. At 804, features may be extracted from one or portions of data, such as text data and/or the executable instructions representing one or more of an intent and an entity attribute. At 806, data representing a subset of intent-related data (e.g., intent) and data representing one or more entity attributes (e.g., parameters) may be identified.

At 808, data representing a flow set including an adaptive flow set of any number of adaptive flow sets may be selected. At 810, data may be generated as a reply as a function of a subset of intent-related data and data representing one or more entity attributes. As an example, intent-related data may describe an overarching content or topic of an electronic message, with entity attributes including data describing parameters of the electronic message. At 810, data may be generated as a reply to an electronic message. The reply may include data as a function of one or more of a computed "intent," context data, entity attribute data, and any other types of data.

At 812, data representing another subset of intent-related data and data representing one or more other entity attributes may be identified. In some examples, the other subset of intent-related data and the other data representing one or more other entity attributes may be derived from a subsequent or successive incoming electronic message, according to some embodiments. At 814, data representing another adaptive flow set based on at least other subsets of intent-related data may be selected.

Figure 9:
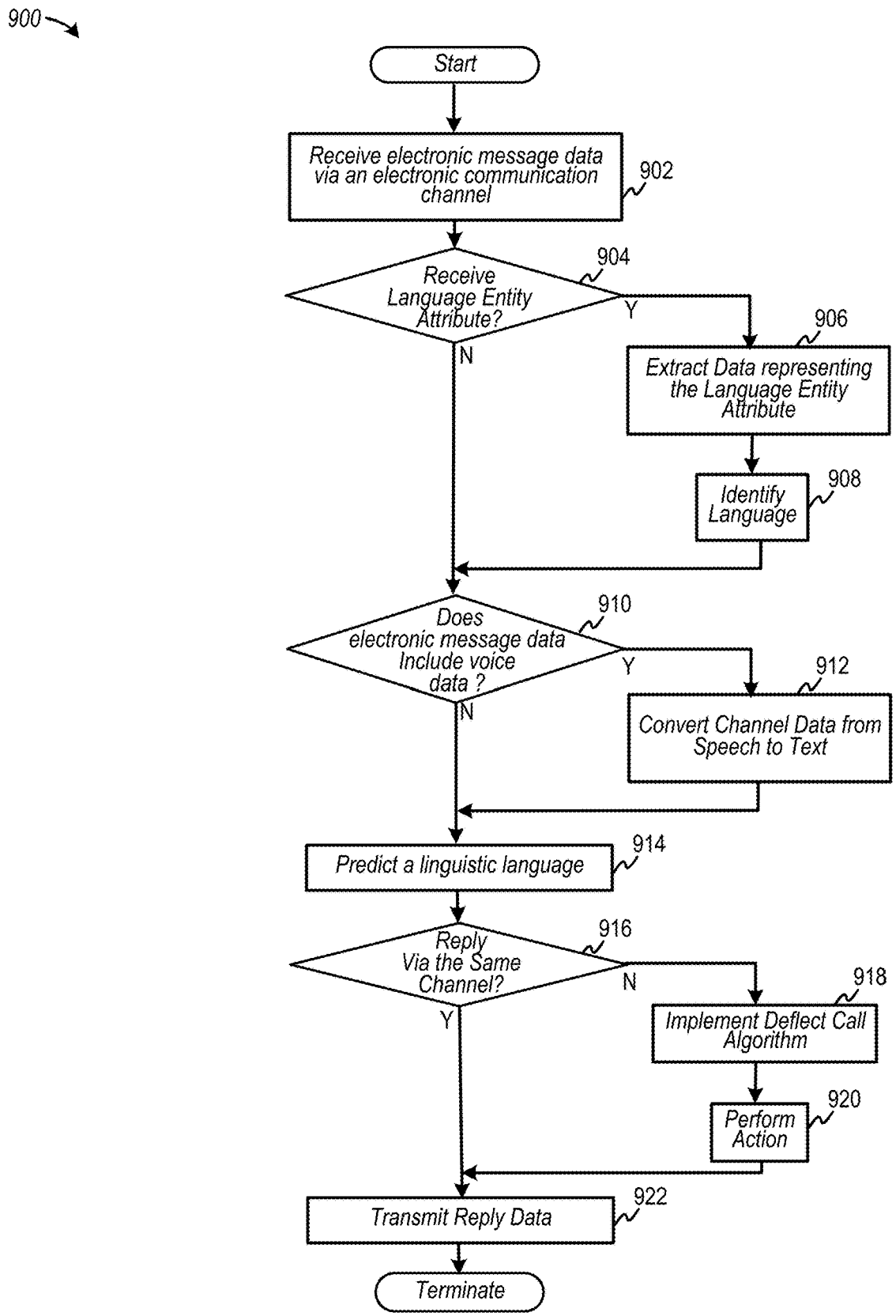
FIG. 9 is a flow diagram as an example of facilitating automated responses to electronic messages in various linguistic languages, according to some embodiments.

FIG. 9 is a flow diagram as an example of facilitating automated responses to electronic messages in various linguistic languages, according to some embodiments. At 902, electronic message data may be received via an electronic communication channel, which may have a specific or proprietary protocol or data format for communication. At 904, a determination is made as to whether an entity attribute (e.g., a parameter or metadata) has been received to identify one or more linguistic languages associated with electronic message. If so, flow 900 proceeds to 906 at which data representing a language entity attribute may be extracted from data streaming over an electronic communication channel. At 908, a language may be identified. But if an electronic message is not associated with metadata describing a linguistic attribute, flow 900 proceeds to 910.

At 910, a determination is made as to whether an electronic message data includes voice data or other audio data that embodies a request or inquiry. If an electronic message includes voice data, flow 900 moves to 912 at which channel data (e.g., a channel including voice data) may be converted from audio (e.g., speech) to a text data format. But if an electronic message is not detected as including speech or voice data, flow 900 proceeds to 914. At 914, a linguistic language may be predicted based on, for example, computational results of a natural language processing algorithm or device. At 916, a determination is made as to whether a potential response may be transmitted similarly or in a same electronic communication channel as the received electronic message. If so, flow 900 proceeds to 922 to transmit reply data.

However, if a reply to be transmitted is in a different electronic communication channel other than a received electronic message, then flow 900 proceeds to adapt to a modified response. For example, a user may use a telephone (e.g., using voice data) or any other non-textual data to trigger a request or any other communication. At 918, a call deflection algorithm may be implemented, whereby voice-based electronic messages into an automated predictive response computing system may generate asynchronous communications to via any number of electronic communications channels to any number of message computing systems, such as described in FIG. 1 as an example.

Figure 10:
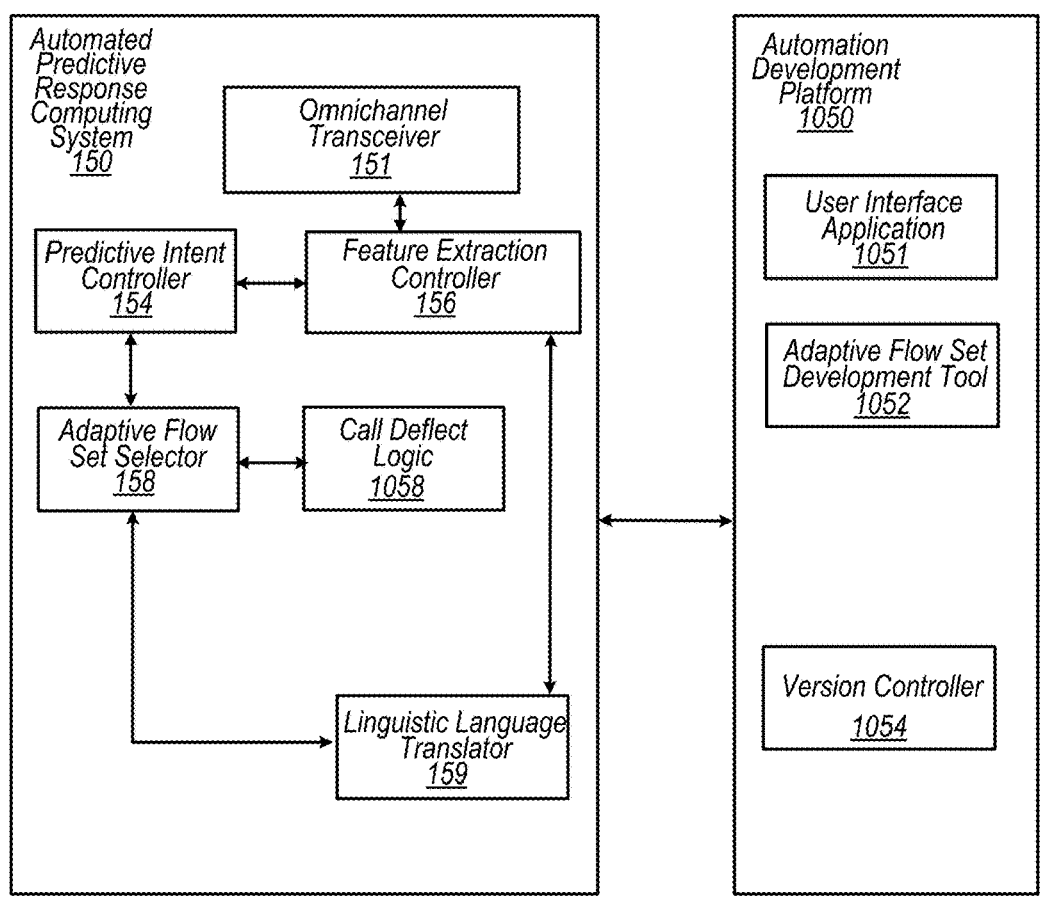
FIG. 10 is a functional diagram of an automated predictive response computing system including called deflect logic coupled to an automation development platform, according to some examples.

FIG. 10 is a functional diagram of an automated predictive response computing system including called deflect logic coupled to an automation development platform, according to some examples. In the example shown, diagram 1000 includes an automated predictive response computing system 150 and its elements described in FIG. 1 and in various other portions of the Specification and Figures. Note that elements depicted in diagram 1000 of FIG. 10 may include structures and/or functions as similarly-named or similarly-numbered elements depicted in other drawings or described herein.

Automated predictive response computing system 150 of FIG. 10 is shown to include call deflect logic 1058, which may be configured to identify voice-based electronic messages incoming into system 150 and generate in an asynchronous or a text-based response. Automation development platform 1050 may include a user interface application 1051, an adaptive flow set development tool 1052, and a version controller 1054. In some examples, automation development platform 1050 may be configured to generate an automated application (e.g., as a single automated application) that may adaptively respond to all or predominant amount of inquiries by users. In at least one case, automation development platform 1050 may be configured to generate a bot or chat bot (e.g., as a single bot) that is configured to connect with multiple messaging or voice channels for a common automated application or project. Further, automation development platform 1050 may be configured to support multiple languages and synchronize changes between them.

User interface application 1051 may include executable instructions to facilitate drag and drop functionalities to develop adaptive flow sets, as described herein. Adaptive flow set development tool 1052 may be configured to design electronic conversations, and develop chat bots for multiple channels and for multiple languages. Version controller 1054 may be configured to identify changes to draft versions, to implement the draft versions as a developmental version for purposes of collaboration, and to promote the development-based version to production.

Figure 11:
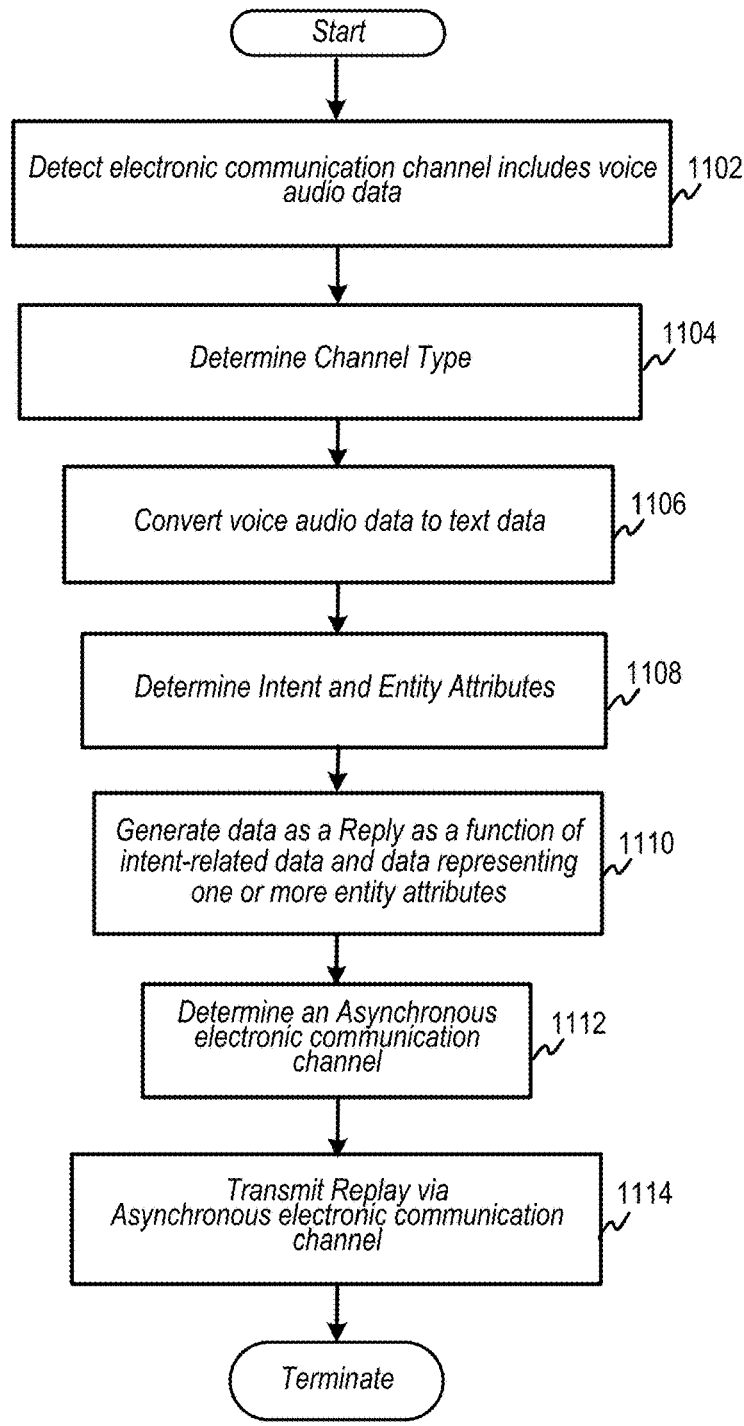
FIG. 11 is a flow diagram depicting an example of deflecting a voice-based electronic message to an asynchronous response message, according to some embodiments.

FIG. 11 is a flow diagram depicting an example of deflecting a voice-based electronic message to an asynchronous response message, according to some embodiments. Flow 1100 begins at 1102, at which an electronic communication channel may be detected as including voice audio data. At 1104, a type of channel (e.g., an electronic communication channel) may be determined. For example, a channel type may be classified as exchanging data as voice-based data. At 1106, voice audio data may be converted to text data, and at 1108 an intent and one or more entity attributes may be determined. At 1110, data may be generated as a reply, whereby the reply is a function of intent-related data and/or data representing entity attributes. At 1112, flow 1100 may determine an asynchronous electronic communication channel (e.g., a channel configured to transport a text-based message, such as an SMS message, an email-based message. or other asynchronous messages). At 1114, a reply may be transmitted via an asynchronous electronic communication channel.

Figure 12:
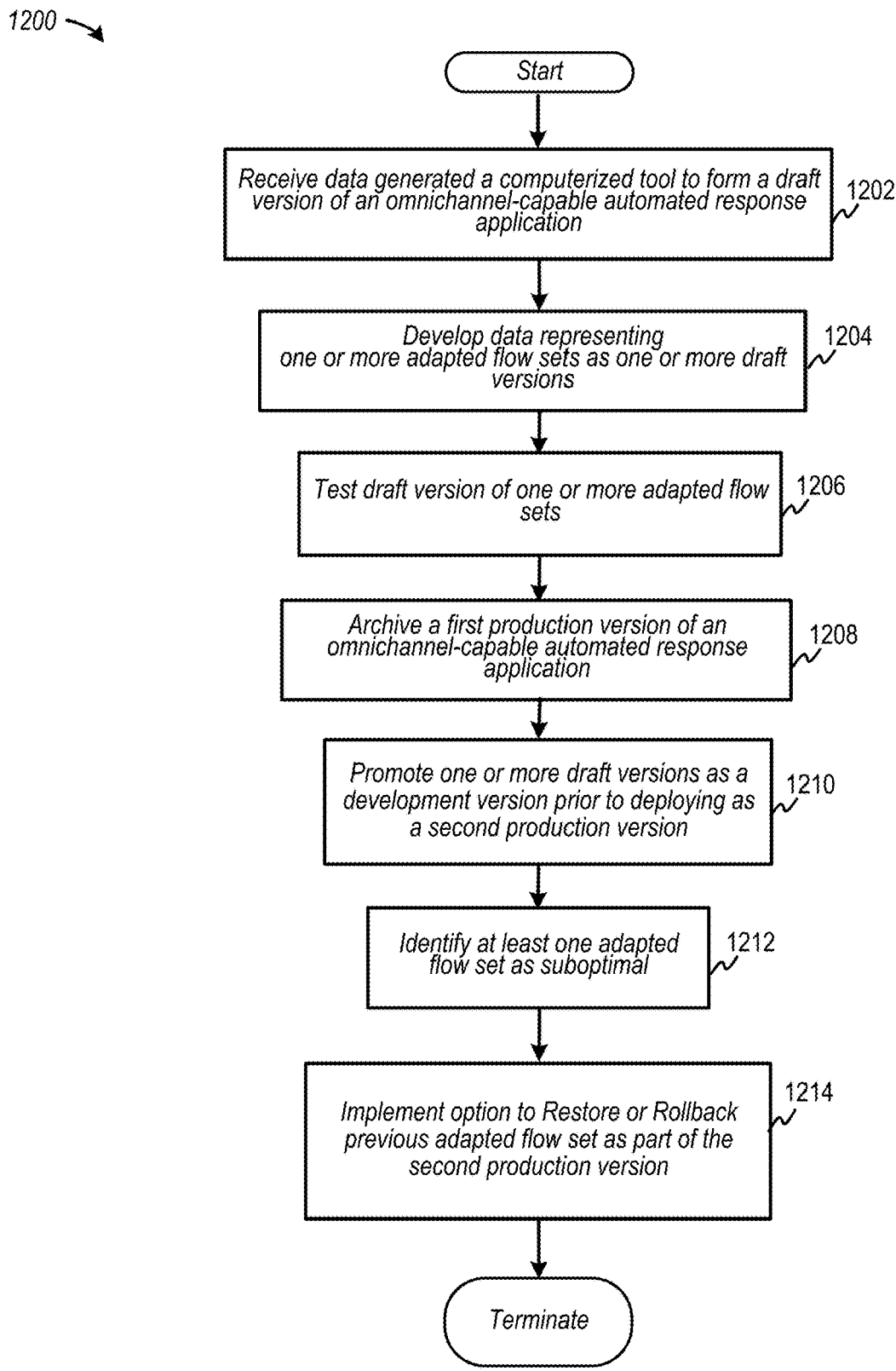
FIG. 12 is a flow diagram depicting an example of managing modifications and versions for an automated response message application, according to some examples.

FIG. 12 is a flow diagram depicting an example of managing modifications and versions for an automated response message application, according to some examples. Flow 1200 begins at 1202, at which dated generated at a computerized tool may be received to form a draft version of an omnichannel-capable automated response application. At 1204, data representing one or more adapted flow sets may be developed as one or more draft versions. At 1206, one or more draft versions of one or more adapted flow sets may be tested for quality assurance purposes. At 1208, a first production version of an omnichannel-capable automated response application may be archived to store proven adaptive flow sets and associated data applications. At 1210, one or more draft versions may be promoted by deploying the draft versions as a second production version. At 1212, at least one adapted flow set may be identified as being suboptimal. In this case, at 1214, an option exists to restore or rollback previous adaptive flow sets as part of a newly-released production version.

Figure 13:
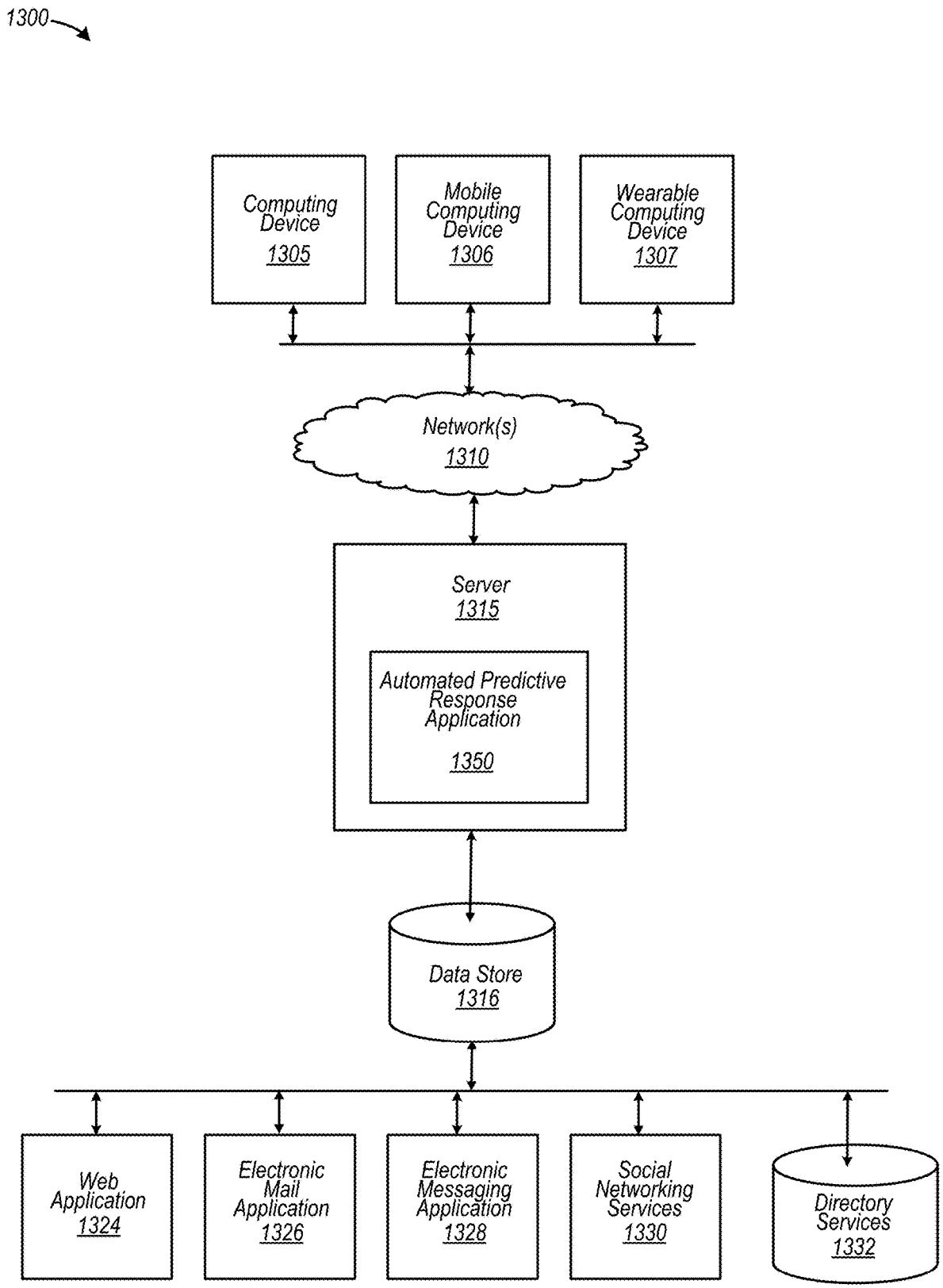
FIG. 13 depicts an example of a system architecture to provide a computing platform to host an application to analyze electronic messages including data associated with electronic messages, according to an example.

FIG. 13 depicts an example of a system architecture to provide a computing platform to host an application to analyze electronic messages including data associated with electronic messages, according to an example. Data constituting executable instructions (e.g., remote applications) and other content, such as text, video, audio, etc. may be stored in (or exchanged with) various communication channels or storage devices. For example, various units of message data or content may be stored using one or more of a web application 1324 (e.g., a public data source, such as a new aggregation web site), an email application service 1326, an electronic messaging application 1328 (e.g., a texting or messenger application), social networking services 1330 and a services platform and repository 1332 (e.g., cloud computing services provided by Google® cloud platform, an AWS® directory service provided by Amazon Web Services, Inc., or any other platform service). A server 1315 may implement an automated predictive response application 1350 to perform various functionalities as described herein. As an example, server 1315 may be a web server providing the applications 1350 and 1352 via networks 1310. As an example, a client computing device may be implemented and/or embodied in a computer device 1305, a mobile computing device 1306 (e.g., a smart phone), a wearable computing device 1307, or other computing device. Any of these client computing devices 1305 to 1307 may be configured to transmit electronic messages and content (e.g., as electronic text or documents, video content, audio content, or the like) from the store 1316, and may be configured to receive content (e.g., other electronic content).

Figure 14:
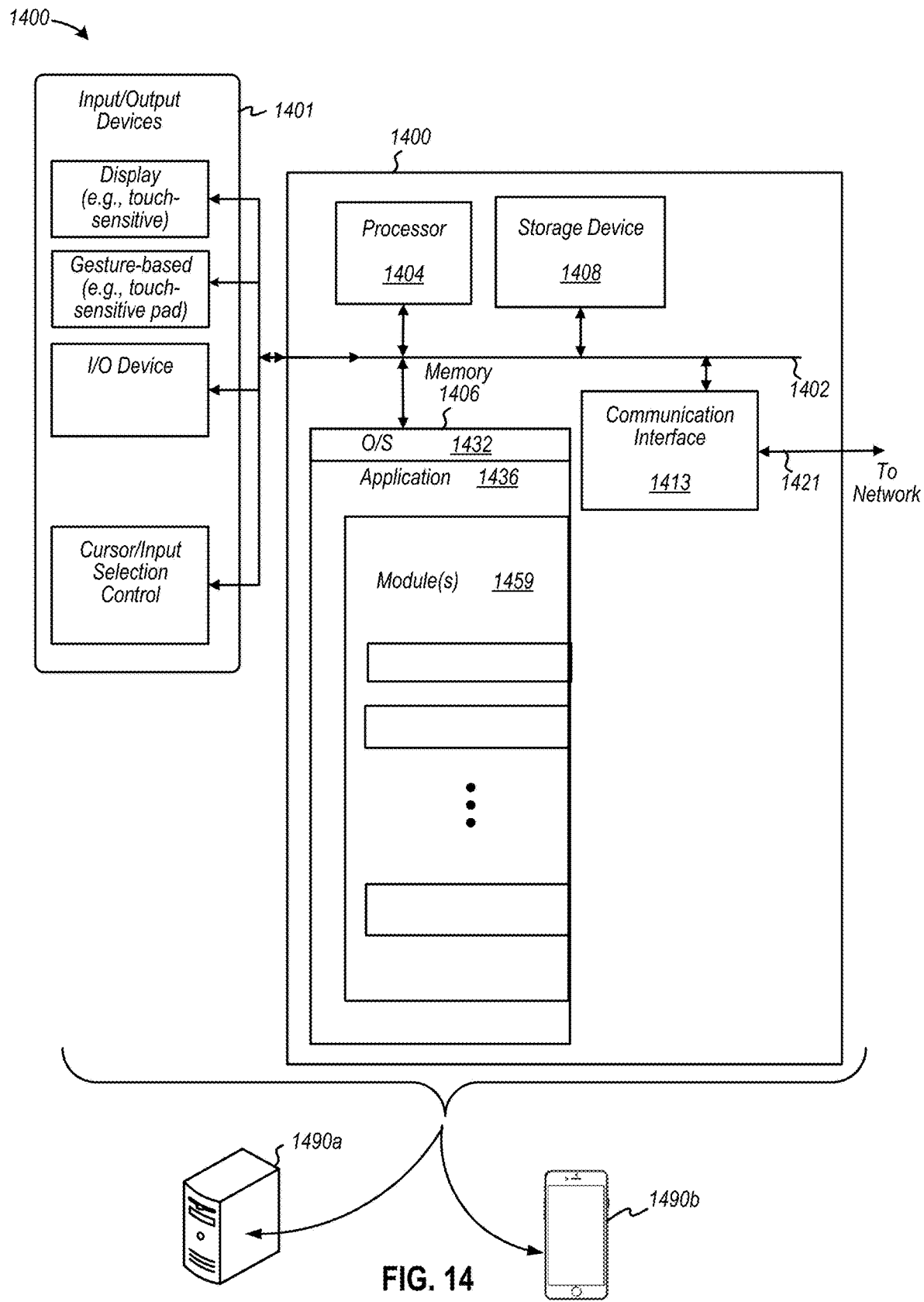
FIG. 14 illustrates examples of various computing platforms configured to provide various functionalities to components of an electronic message platform 1400 configured to analyze electronic message data and provide functionalities described herein.

FIG. 14 illustrates examples of various computing platforms configured to provide various functionalities to components of an electronic message platform 1400 configured to analyze electronic message data and provide functionalities described herein. Computing platform 1400 may be used to implement computer programs, applications, methods, processes, algorithms, or other software, as well as any hardware implementation thereof, to perform the above-described techniques.

In some cases, computing platform 1400 or any portion (e.g., any structural or functional portion) can be disposed in any device, such as a computing device 1490*a*, mobile computing device 1490*b*, and/or a processing circuit in association with initiating any of the functionalities described herein, via user interfaces and user interface elements, according to various examples.

Computing platform 1400 includes a bus 1402 or other communication mechanism for communicating information, which interconnects subsystems and devices, such as processor 1404, system memory 1406 (e.g., RAM, etc.), storage device 1408 (e.g., ROM, etc.), an in-memory cache (which may be implemented in RAM 1406 or other portions of computing platform 1400), a communication interface 1413 (e.g., an Ethernet or wireless controller, a Bluetooth controller, NFC logic, etc.) to facilitate communications via a port on communication link 1421 to communicate, for example, with a computing device, including mobile computing and/or communication devices with processors, including database devices (e.g., storage devices configured to store atomized datasets, including, but not limited to triplestores, etc.). Processor 1404 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1400 exchanges data representing inputs and outputs via input-and-output devices 1401, including, but not limited to, keyboards, mice, audio inputs (e.g., speech-to-text driven devices), user interfaces, displays, monitors, cursors, touch-sensitive displays, touch-sensitive input and outputs (e.g., touch pads), LCD or LED displays, and other I/O-related devices.

Note that in some examples, input-and-output devices 1401 may be implemented as, or otherwise substituted with, a user interface in a computing device associated with, for example, a user account identifier in accordance with the various examples described herein.

According to some examples, computing platform 1400 performs specific operations by processor 1404 executing one or more sequences of one or more instructions stored in system memory 1406, and computing platform 1400 can be implemented in a client-server arrangement, peer-to-peer arrangement, or as any mobile computing device, including smart phones and the like. Such instructions or data may be read into system memory 1406 from another computer readable medium, such as storage device 1408. In some examples, hard-wired circuitry may be used in place of or in combination with software instructions for implementation. Instructions may be embedded in software or firmware. The term "computer readable medium" refers to any tangible medium that participates in providing instructions to processor 1404 for execution. Such a medium may take many forms, including but not limited to, non-volatile media and volatile media. Non-volatile media includes, for example, optical or magnetic disks and the like. Volatile media includes dynamic memory, such as system memory 1406.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1402 for transmitting a computer data signal.

In some examples, execution of the sequences of instructions may be performed by computing platform 1400. According to some examples, computing platform 1400 can be coupled by communication link 1421 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1400 may transmit and receive messages, data, and instructions, including program code (e.g., application code) through communication link 1421 and communication interface 1413. Received program code may be executed by processor 1404 as it is received, and/or stored in memory 1406 or other non-volatile storage for later execution.

In the example shown, system memory 1406 can include various modules that include executable instructions to implement functionalities described herein. System memory 1406 may include an operating system ("O/S") 1432, as well as an application 1436 and/or logic module(s) 1459. In the example shown in FIG. 14, system memory 1406 may include any number of modules 1459, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. These can be varied and are not limited to the examples or descriptions provided.

In some embodiments, modules 1459 of FIG. 14, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1459 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1459 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 1459 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
    detecting data representing one or more electronic messages associated with an electronic communication channel in a plurality of various electronic communication channels associated with multiple data sources, each of which is associated with a processor and memory;
    extracting features from one or more portions of data of the one or more electronic messages including a subset of features derived from units of image data using an image recognition algorithm to perform one or more symbolic character recognition and facial recognition;
    identifying data representing a first subset of intent-related data and data representing one or more entity attributes in the subset of features;
    selecting data identifying a flow set including a first adaptive flow set of a subset of adaptive flow sets based on at least the first subset of intent-related data;
    generating data as a reply as a function of the first subset of intent-related data and data representing one or more entity attributes;
    identifying data representing a second subset of intent-related data and data representing one or more other entity attributes in the subset of features;
    selecting data representing a second adaptive flow set from the subset of adaptive flow sets based on at least the second subset of intent-related data implementing a call deflection algorithm to deflect the reply via another electronic communication channel other than the electronic communication channel.

2. The method of claim 1 further comprising:
    generating data as another reply as a function of the second subset of intent-related data.

3. The method of claim 1 wherein extracting the features comprises:
    classifying the data representing the one or more electronic messages as being associated with an intent.

4. The method of claim 3 wherein classifying the data comprises:
    applying one or more natural language processing ("NLP") algorithms to predict the intent.

5. The method of claim 1 further comprising:
    analyzing data values representing the first subset of intent-related data and the second subset of intent-related data to derive a context or the one or more electronic messages.

6. The method of claim 5 further comprising:
    determining other subsets of intent-related data;
    correlating the first subset, the second subset, and the other subsets of intent-related data to corresponding subsets of adaptive flow sets; and
    selecting the corresponding subsets of adaptive flow sets in the flow set adaptively based to generate corresponding reply data.

7. The method of claim 1 further comprising:
    extracting data representing a linguistic language as one of the entity attributes; and
    implementing the flow set using the linguistic language.

8. The method of claim 7 wherein the one of the entity attributes is metadata received via the electronic communication channel.

9. The method of claim 1 further comprising:
    analyzing the data representing the one or more electronic messages to predict a linguistic language;
    generating the reply using the linguistic language.

10. The method of claim 9 further comprising:
    implementing a natural language processing ("NLP") algorithm to predict the linguistic language.

11. The method of claim 1 further comprising:
    receiving an electronic message of the one or more electronic messages a data representing voice-based audio data.

12. The method of claim 11 further comprising:
    analyzing the data representing the voice-based audio data to predict a linguistic language; and
    generating the reply using the linguistic language.

13. The method of claim 12 wherein the reply is a text-based reply using the linguistic language.

14. The method of claim 1 further comprising:
    archiving as a version of one or more of the flow set and the subset of adaptive flow sets;
    detecting a modification to the one or more of the flow set and the subset of adaptive flow sets; and
    implementing a modified flow set or a modified subset of adaptive flow sets response to the modification.

15. The method of claim 1 further comprising:
    implementing the method using a single bot application.

16. A system comprising:
    a data store configured to receive streams of data via a network into an application computing platform; and
    a processor configured to execute instructions to implement an application configured to:
    detect data representing one or more electronic messages associated with an electronic communication channel in a plurality of various electronic communication channels associated with multiple data sources, each of which is associated with a processor and memory;
    extract features from one or more portions of data of the one or more electronic messages including a subset of features derived from units of image data using an image recognition algorithm to perform one or more symbolic character recognition and facial recognition;
    identify data representing a first subset of intent-related data and data representing one or more entity attributes in the subset of features;
    select data identifying a flow set including a first adaptive flow set of a subset of adaptive flow sets based on at least the first subset of intent-related data;
    generate data as a reply as a function of the first subset of intent-related data and data representing one or more entity attributes;

identify data representing a second subset of intent-related data and data representing one or more other entity attributes in the subset of features;

select data representing a second adaptive flow set from the subset of adaptive flow sets based on at least the second subset of intent-related data; and implementing a call deflection algorithm to deflect the reply via another electronic communication channel other than the electronic communication channel.

17. The system of claim 16 wherein the processor is further configured to:

generate data as another reply as a function of the second subset of intent-related data.

18. The system of claim 16 wherein the processor is further configured to:

classify the data representing the one or more electronic messages as being associated with an intent.

19. The system of claim 18 wherein the processor is further configured to:

apply one or more natural language processing ("NLP") algorithms to predict the intent.

20. The system of claim 16 wherein the processor is further configured to:

analyze data values representing the first subset of intent-related data and the second subset of intent-related data to derive a context or the one or more electronic messages.

* * * * *